United States Patent [19]

Katznelson

[11] Patent Number: 5,125,100
[45] Date of Patent: Jun. 23, 1992

[54] OPTIMAL SIGNAL SYNTHESIS FOR DISTORTION CANCELLING MULTICARRIER SYSTEMS

[76] Inventor: Ron D. Katznelson, 3913 Caminito Del Mar Surf, San Diego, Calif. 92130

[21] Appl. No.: 547,927

[22] Filed: Jul. 2, 1990

[51] Int. Cl.$^5$ .................. H04H 1/04; H04N 7/12
[52] U.S. Cl. ...................... 455/6.1; 358/86; 358/186; 455/63; 455/103; 455/126
[58] Field of Search ........... 455/4, 6, 3, 43, 44, 455/59, 60, 63, 112, 102, 103, 108, 116, 126, 114; 358/86, 186, 84; 370/69.1, 121

[56] References Cited

U.S. PATENT DOCUMENTS

| | | | |
|---|---|---|---|
| 2,575,993 | 11/1951 | Bennett et al. | 455/59 |
| 3,665,316 | 5/1972 | Jeffers . | |
| 3,898,566 | 8/1975 | Switzer et al. | 455/4 |
| 4,373,160 | 2/1983 | Cooper | 343/100 SA |
| 4,646,359 | 2/1987 | Furrer | 455/108 |
| 4,670,789 | 6/1987 | Plume | 358/186 |
| 4,805,014 | 2/1989 | Sahara et al. | 358/86 |
| 4,958,230 | 9/1990 | Sonnalagadda et al. | 358/186 |

OTHER PUBLICATIONS

I. Switzer, "Phase Phiddling", 23rd Annual NCTA Convention Official Transcript, 1974, pp. 2-21.
I. Switzer, "A Harmonically Related Carrier System for Cable Television", IEEE Transactions, vol. COM-23, Jan. 1975, pp. 155-156.
W. Krick, "Improvement of CATV Transmission Using an Optimum Coherent Carrier System", IEEE Transactions, vol. CATV-5, Apr. 1980, pp. 65-71.
G. Franck et al., "Identification of a Large Water--Heated Crossflow Heat Exchange with Binary Multifrequency Signals", Identification and System Parameter Estimation, 1985, vol. 2, pp. 1859-1864.
LeCroy Crop, "Technical Tutorial", 1990 Catalog Reference Guide to Digital Waveform Instruments, pp. IV 1-13, IV 36-39, IV 48-58.

Primary Examiner—Reinhard J. Eisenzopf
Assistant Examiner—Chi H. Pham
Attorney, Agent, or Firm—Knobbe, Martens, Olson & Bear

[57] ABSTRACT

A system and method for minimizing peak amplitudes and distortion in a communication system generating a composite signal. The present invention provides and maintains optimum phase conditions and a near-optimal set of auxiliary carriers in a closed-loop feedback system. An application to community antenna television (CATV) is disclosed.

51 Claims, 15 Drawing Sheets

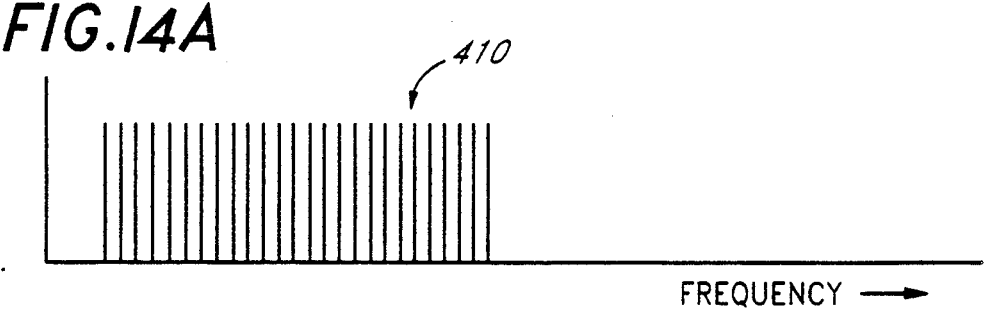
FIG.14A
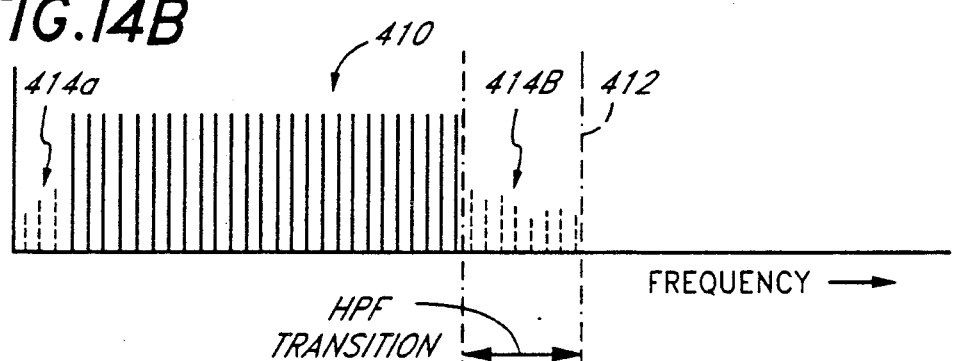
FIG.14B
FIG.14C
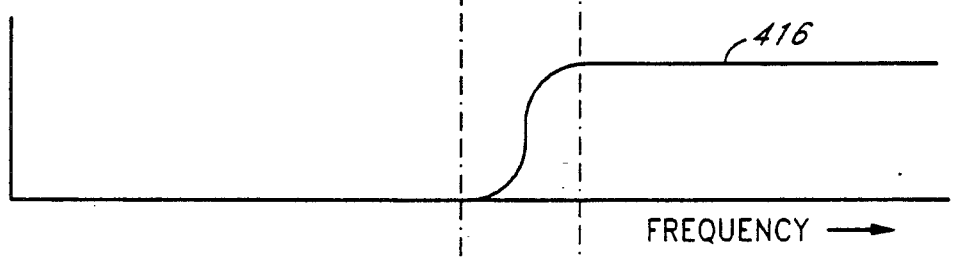
FIG.14D
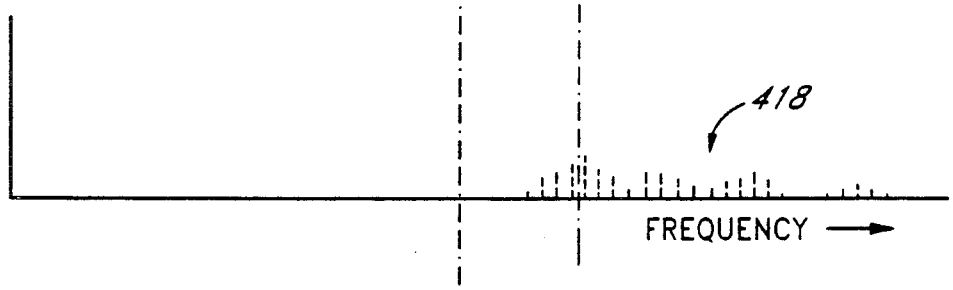
FIG.14E
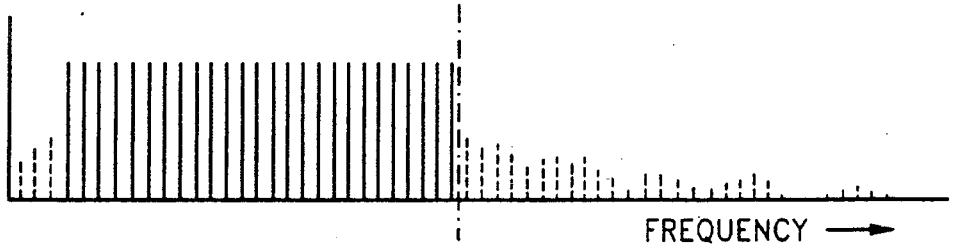

OPTIMAL SIGNAL SYNTHESIS FOR DISTORTION CANCELLING MULTICARRIER SYSTEMS

BACKGROUND OF THE INVENTION

1. Field of the Invention

The present invention relates to communications systems and, more particularly, to multicarrier systems such as community antenna television systems, or CATV.

1. Background of the Invention

The problems of nonlinear distortions and limited dynamic range in multicarrier, multichannel systems, such as CATV, have received renewed attention with the advent of optical fiber and lasers being used in the distribution of television signals. As is well known, North American CATV systems transmit multiple channels on a set of frequency carriers that may be spaced at 6 MHz intervals. The modulated carriers are combined into a composite multicarrier signal which is distributed to end users from so-called "head-end" transmission stations. Nonlinear distortions generally arise from nonlinearities in the distribution amplifiers between the head-end and the end user causing intermodulation between the various carriers.

In a typical CATV system, losses on the order of 20 decibels (dB) of signal power across a kilometer of coaxial cable is not uncommon. Thus, presently, between the head-end and the television receiver of an end user there may be as many as 20 to 30 amplifiers that recover an attenuated signal transmitted across coaxial cable. Resulting amplifier noise and signal distortions through the system translate into significant losses in dynamic range, i.e., the ratio of the signal to the noise and distortion, of the transmission which substantially degrades with distance.

Yet, while viewers seek more faithful and accurate video and audio reproduction from improvements in noise reduction and dynamic range, demand increases for more television channels. Because optical transmission losses are only of the order of 0.5 dB per kilometer, the industry has been turning to optical signal transmission. A challenge is thus encountered in facilitating reduction of nonlinear distortion components and additional dynamic range with the limitations and cost of optical transducers, for instance, lasers, external optical modulators and light amplifiers.

High speed optical transmitters are increasingly being employed in communications applications, but these applications are generally digital transmissions wherein signal linearity is hardly an issue of concern. However, if digital transmission was used in a CATV system, the costs of installing digital-to-analog converters at each end user would be prohibitive. Thus, due to the fact that essentially no cost is incurred at the end user when the signal format is compatible with existing television receivers, the advantages of carrying analog multichannel waveforms on optical links cannot be overlooked.

Although further improvement in the performance and price of optical transmission devices is needed, recent developments in optical transmitters show significant improvements in their analog characteristics. For instance, improvements have been made in the linearity, optical power and linear dynamic range of semiconductor lasers.

Clearly, digital optical transmission in the Gigabit per second range makes use of the enormous bandwidth available with optical transmitters. On the other hand, the linearity limitations for current practice CATV analog transmissions requiring multicarrier amplitude modulation (AM) place a severe limit on channel capacity and loss budgets, i.e., the allowed loss in signal power that provides adequate dynamic range. At the same time, due to these limitations, analog transmissions do not make full use of the "commodity" of bandwidth available in optical transmission. Hence, it is desirable to find a method of utilizing this high bandwidth capability of optical transmitters for the purposes of distortion suppression and improved dynamic range, while maintaining an analog compatible transmission.

With the objective of reducing intermodulations caused by nonlinear distortions, it is desirable to make a multicarrier system harmonically related and coherent. A harmonically related system is one in which all carriers have frequencies that are integral multiples of a common fundamental frequency. Then, if all carrier frequencies are phase-locked to the appropriate harmonics of the fundamental frequency, the system is said to be coherent. Even the standard CATV frequency plan with frequencies given by $f_n = n(6 \text{ MHz}) + 1.25$ MHz can be viewed as harmonically related if each carrier is phase-locked to the corresponding harmonics of a 0.25 MHz fundamental frequency. Harmonically related signals, as defined here, need not have consecutive integral multiples of the fundamental frequency. In this regard it should be noted that the terminology in the CATV industry defines Harmonically Related Carrier (HRC) systems as only such systems wherein the frequencies are consecutive harmonics of a 6 MHz fundamental frequency while the case in which the carrier frequencies are phase locked to the standard frequency plan referred to above, are defined as Incrementally Related Carrier (IRC) systems. Here, both types of systems are generally defined as Harmonically Related Carrier systems.

It is well known that in such coherent multicarrier systems, peak-to-peak amplitudes of the composite signal may be reduced by proper phase adjustment of individual carriers without reducing their amplitudes. As amplifier and optical transmitter transfer functions are typically characterized by sigmoidal curves, being nonlinear at low and high input levels and generally linear in the middle region of the curve, a reduction of peak amplitudes allows the multicarrier signal to be transmitted along the linear portion of the transfer function. Therefore, distortions of the composite signal are minimized.

Such coherent multicarrier systems and approaches for adjusting the carrier phases were described in the patent to Switzer, et al., (U.S. Pat. No. 3,898,566) which is incorporated by reference herein. Additional descriptions can be found in two articles by I. Switzer, "Phase Phiddling" published in the 23rd Annual NCTA convention Official Transcript, pp. 2-21, (1974) and "A Harmonically Related Carrier System for Cable Television" published in IEEE Transactions on Communications, Vol. COM-23, pp. 155-166, Jan. (1975) (hereinafter "Switzer (1975)") and in a more recent article by W. Krick, "Improvement of CATV transmission using an optimum coherent carrier system" published in IEEE Transactions on Cable Television, Vol. CATV-5, pp. 65-71, Apr. (1980).

The phase adjustment methods described in the above-cited references were essentially ad hoc and did not yield global optimum phase configurations. The problem with an ad hoc phase tuning method, such as that suggested by Switzer, et al., presents itself in two basic ways. First, the method essentially relies on one variable, the amplitude peak, which is used as a determinant for the direction that each carrier phase must be fine tuned in order to reduce the peak value. The problem that arises here is due to dimensionality: it is difficult to optimize an N degrees of freedom configuration with many local minima by using only one parameter to guide the process.

The second problem is that of stability and interchannel timing drifts due to thermal effects, power variations and component aging. More specifically, even if one is equipped with a list of optimal phases for each channel (for example, a list that may be obtained by a computer numerical simulation of the system described herein), implicit in that representation of phase for different frequencies is the existence of absolute time common to all channel modulators. Thus, the system would still have to be calibrated to ensure that the initial zero crossing of all signals was aligned, and subsequently the phase offsets of the list would have to be adjusted for each carrier. Furthermore, the list of optimal phases may be relevant only for equal amplitude conditions, a situation that can easily be deviated from in actual systems, where relative amplitude drift of up to 2 dB is possible. Furthermore, whenever additional carriers are added to a system, a new "optimal phase list" must be used to recalibrate and readjust the phases, thereby interrupting cable service.

Most important is the fact that while phase-lock modulators accept a phase reference to lock on, their output phase may drift significantly with respect to their input reference phase, thus frustrating any stable phase constellation. These phase drifts, in a CATV transmission system, for example, could result from bandpass filters at the modulator's output stages and the combiner that produces the composite multicarrier signal.

In this regard, it is worth noting that given a minimum peak amplitude, phase optimized system, phase deviations of $\pm 5°$ in all carriers of a simulated 81 channel system was found to cause peak amplitude excursion increases as much as 2 dB above optimum setting. It becomes clear that if one intends to make use of the advantages afforded by phase optimization in coherent systems, a consistent method or system that guarantees optimal operation automatically under variable conditions is now needed. The variable conditions may include thermal drifts, utility power fluctuations, output level drifts or even the failure of one or more of the modulators to produce their assigned carriers.

Consequently, a need presently exists for a multicarrier system and method that increases dynamic range and reduces nonlinear distortions. The system should, in addition, have an analog compatible transmission format which can benefit from the additional bandwidth provided by optical transmission. Furthermore, the system and method should optimize phases automatically under variable conditions.

SUMMARY OF THE INVENTION

The above-mentioned needs are satisfied by the present invention which includes a system and method for providing and maintaining optimum phase conditions and a near-optimal set of auxiliary carriers for distortion suppression thus providing additional dynamic range and channel capacity.

The present invention includes a closed-loop multicarrier system which synthesizes auxiliary carriers and optimally controls and maintains the phase of the multicarrier signals in-band so as to minimize both peak amplitude and distortion components. The system employs a coherent carrier configuration in which a specific phase relationship among its carriers is automatically arrived at in a closed-loop feedback system. This novel alignment and control technique, in conjunction with a novel method of the addition of auxiliary carriers, achieves the cancellation of all distortion products except a small fraction of cross-modulation products. The system also achieves the minimization of peak amplitudes to levels that provide dynamic range advantages of the order of 8 dB.

The present invention also includes a system for generating a composite signal having a plurality of harmonically related signals, comprising: (1) a signal generator for generating an arbitrarily selected plurality of harmonically related, receivable signals wherein the receivable signals have frequencies that are integral multiples of a preselected fundamental frequency; (2) a signal generator for generating a selected plurality of harmonically related, auxiliary signals wherein the auxiliary signals have frequencies that are integral multiples of the fundamental frequency, the frequencies of the auxiliary signals selected so that they are different from the frequencies of the receivable signals, the auxiliary signals generated so that peak-to-peak amplitude of the composite signal is less than that obtained from only combining the receivable signals or wherein the composite signal is substantially bilevel; and (3) a signal combiner that combines the receivable signals and the auxiliary signals thereby forming the composite signal.

The present invention further includes a communication system, comprising: (1) a signal generator that generates a composite signal, the composite signal comprising a plurality of harmonically related signals wherein the signals have frequencies that are integral multiples of a preselected fundamental frequency, and wherein each signal has a characteristic parameter; (2) a distortion generator for processing the composite signal with a predetermined function so as to form a distorted composite signal comprising a plurality of nonlinearly derived signals, wherein each nonlinearly derived signal has a characteristic parameter; (3) an analyzer that estimates the parameter of at least a portion of the nonlinearly derived signals; and (4) a parameter adjuster responsive to the processor that adjusts the parameter of at least a portion of the signals of the composite signal thereby reducing peak-to-peak amplitude of the composite signal.

These and other objects and features of the present invention will become more fully apparent from the following description and appended claims taken in conjunction with the accompanying drawings.

BRIEF DESCRIPTION OF THE DRAWINGS

FIG. 14$a$–$e$ is a set of power spectrum diagrams showing the combining steps corresponding to signals associated with the bilevel multicarrier controller shown in FIG. 11.

DETAILED DESCRIPTION OF THE PREFERRED EMBODIMENTS

Reference is now made to the drawings wherein like numerals refer to like parts throughout.

Figure 1:
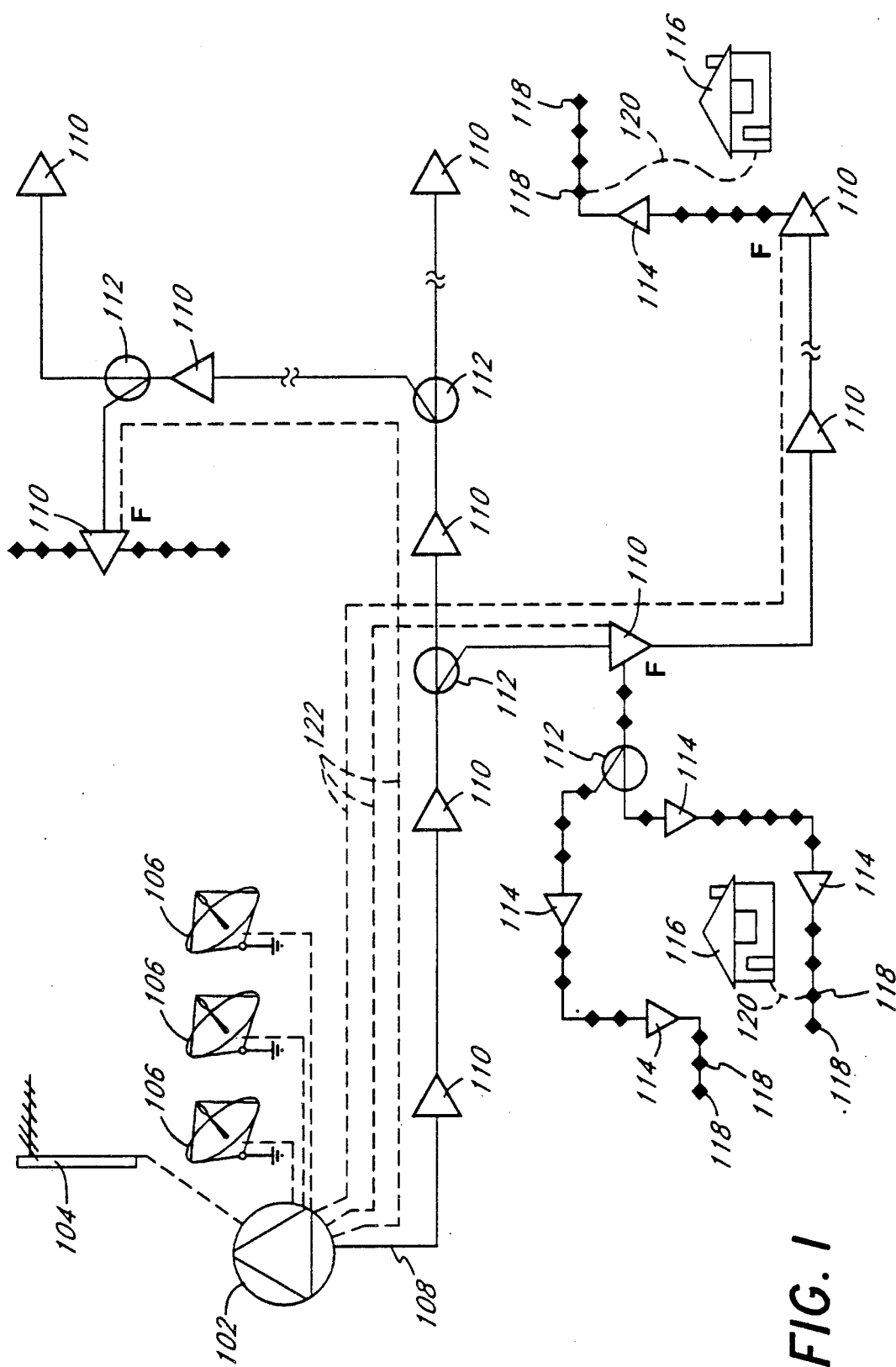
FIG. 1 is a block diagram of one generalized community antenna television (CATV) network.

FIG. 1 schematically describes a typical CATV network. A central head-end 102 receives off-air signals and satellite signals via a set of off-air antennas 104 and satellite TV Receive Only antennas (TVROs) 106 respectively, up-converts or modulates these signals on cable channels, and combines all channels into a multicarrier signal path, or coaxial trunk 108. This path is branched out after successive stages of trunk amplifiers 110, line splitters 112 and distribution amplifiers, or line extenders 114. The multicarrier signal reaches individual subscriber's (end user's) homes 116 through taps 118 and house drops 120 wherein the signal is down-converted by a cable set-top converter (not shown) and then demodulated by a television receiver (not shown).

CATV systems utilizing fiber optic transmission of the composite signal in the network, typically employ "fiber nodes" in location designated by in "F" in FIG. 1. In these systems, a separate fiber optic link 122 is placed between the head-end 102 and each fiber node F, and thus the coaxial trunk 108 and the related trunk amplifiers 110 leading to that fiber node F are bypassed, thereby shortening the amplifier cascade significantly. At each fiber node F, the intensity modulated optical light signal transmitted across the fiber optic link 122 is converted back to an electrical composite radio frequency (RF) signal which is subsequently fed into a standard coaxial distribution network, i.e., the distribution amplifiers 114, taps 118, house drops 120 and homes 116.

The CATV hybrid architecture, including fiber optic links 122, typically requires several laser sources located at the head-end 102, each feeding a separate fiber link 122. The channel capacity, signal-to-noise ratio and optical reach will depend on the dynamic range and linearity of these laser sources. The improvements of the present invention provide for increased dynamic range and thus would facilitate the use of lower cost lasers, improvements in signal-to-noise ratio, increases in the network optical reach and increases in channel capacity. The present invention generally relates to improved transmission of multicarrier signals by the head-end 102.

Figure 2:
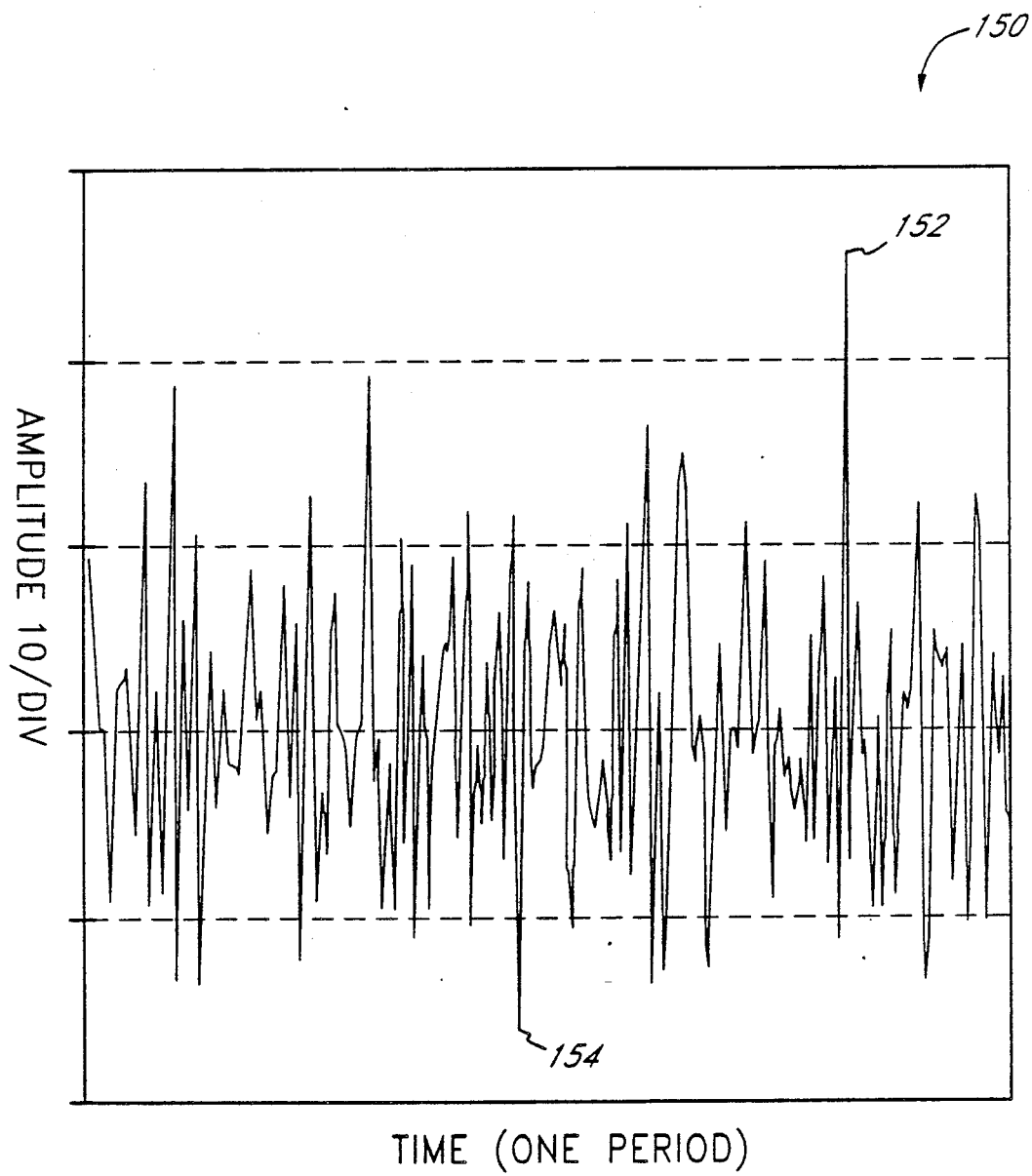
FIG. 2 is a waveform diagram of a non-optimized multicarrier signal having 81 carriers.

FIG. 2 is a waveform diagram illustrating one complete period of a randomly phased coherent multicarrier signal 150 comprising 81 unit amplitude unmodulated CATV carriers. The number of carriers was selected to be 81 for mathematical convenience although a more typical number of carriers in a state-of-the-art CATV system will be between 60 and 80. The peak amplitudes of the multicarrier signal 150 is representative of present multicarrier signals transmitted across many North American CATV networks.

In FIG. 2, the vertical axis represents amplitude divided into units of 10, where one unit corresponds to the amplitude of each carrier. The horizontal axis represents time for one period of the multicarrier signal 150. For this example, a maximum positive peak amplitude 152 is about 25 units and a negative peak amplitude 154 is about −16 units.

Figure 3:
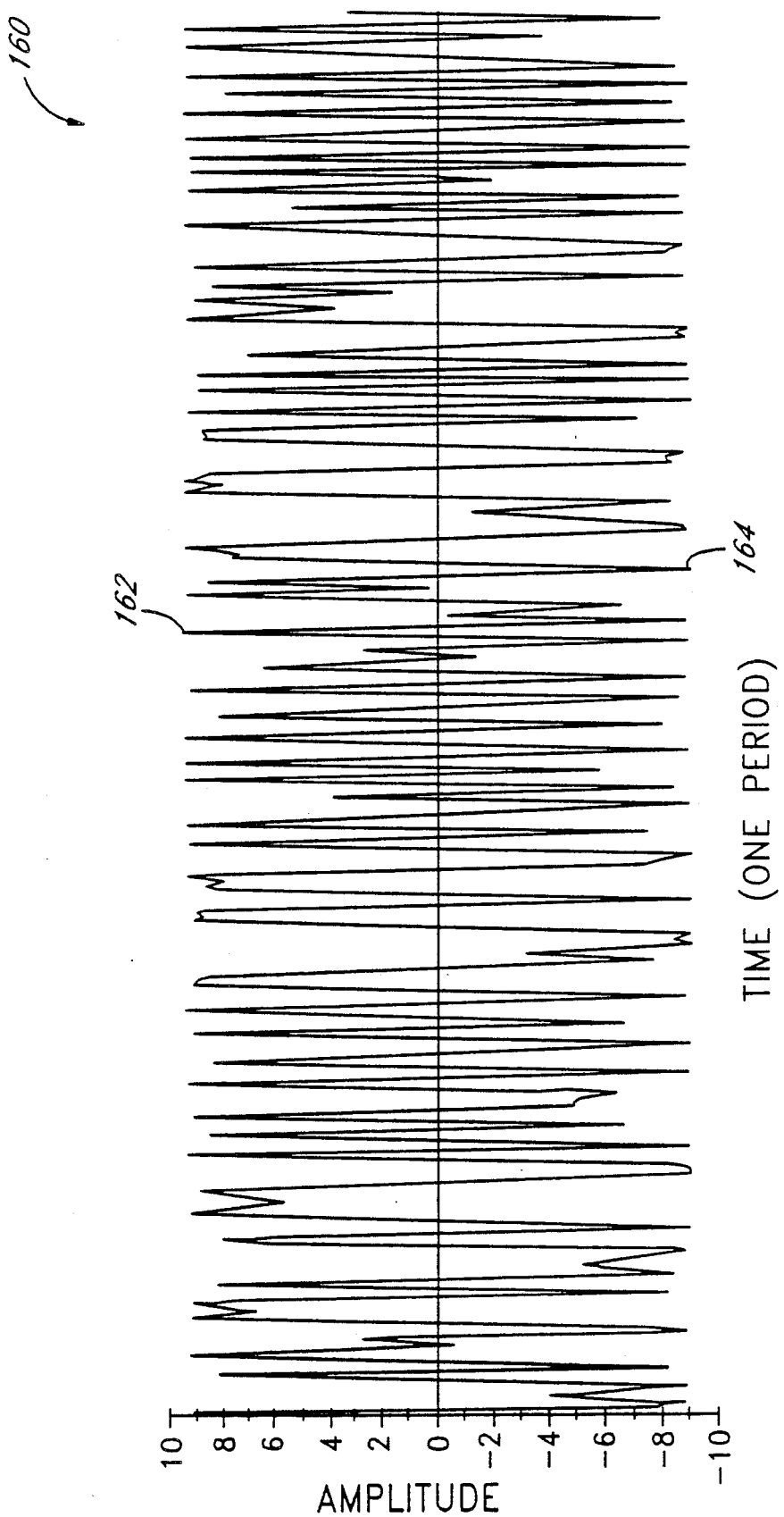
FIG. 3 is a waveform diagram of a near-optimally phased multicarrier signal associated with one preferred embodiment of the present invention.

In contrast to FIG. 2, FIG. 3 illustrates one complete period of a coherent multicarrier signal 160, comprising 81 unit amplitude unmodulated CATV carriers, which has been phase optimized. The optimized coherent signal 160 of FIG. 3 is representative of the type of signal output by a head-end using one preferred embodiment of the present invention. In FIG. 3, the vertical axis represents amplitude divided into units of 1 and the horizontal axis represents the time for one period of the multichannel carrier 160. A maximum positive peak amplitude 162 of the coherent signal 160 is about 9 units and a negative peak amplitude 164 is about −9 units. By minimizing peak-to-peak amplitudes, such as 162, 164, in a coherent signal 160, overall dynamic range of a CATV system is increased.

Figure 4:
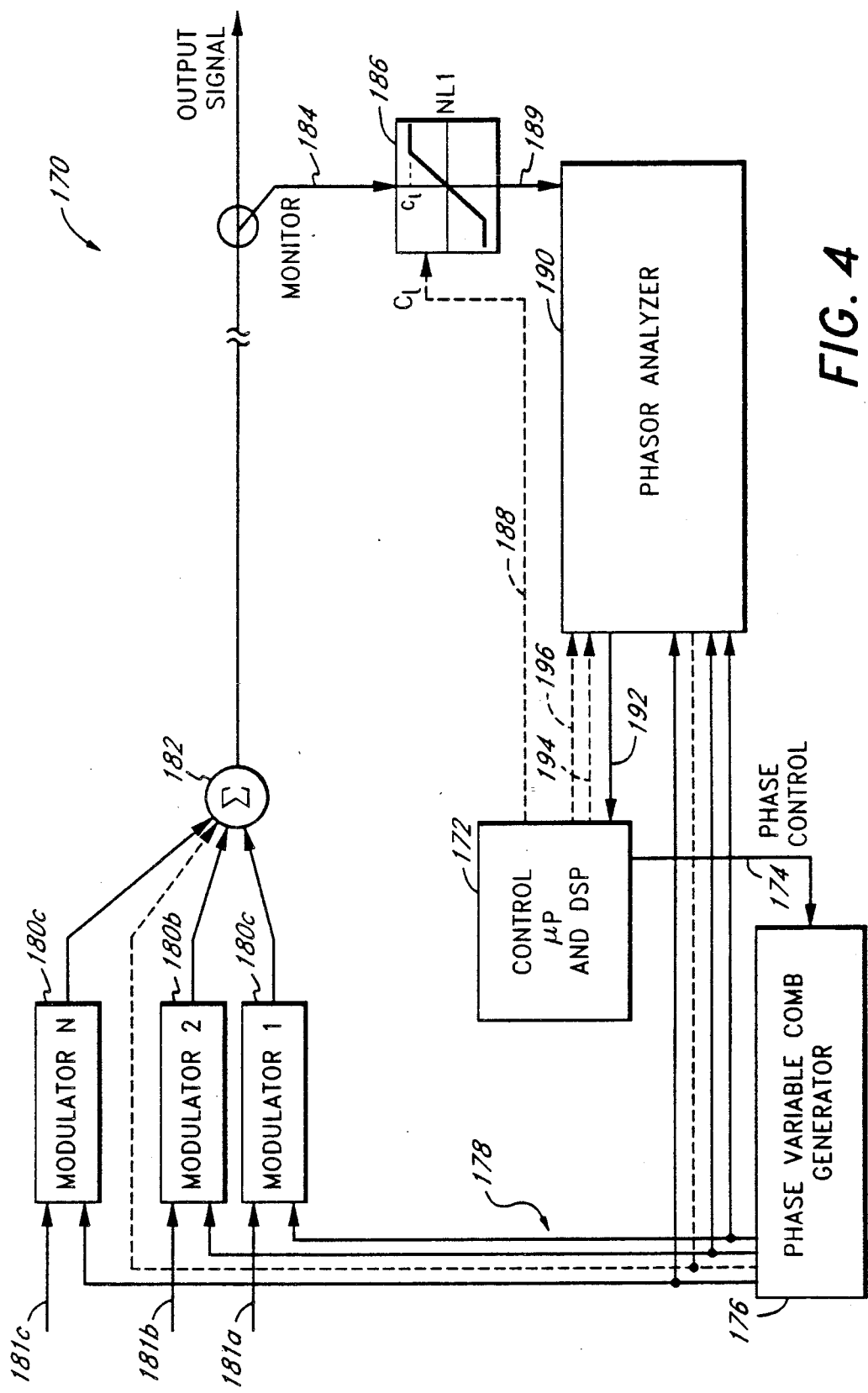
FIG. 4 is a block diagram of one preferred embodiment of a coherent multicarrier controller of the present invention.

Referring now to FIG. 4, the generation of a near-optimal coherent signal, such as the one illustrated in FIG. 3, is provided by one preferred embodiment of a coherent multicarrier controller 170. The controller 170 of FIG. 4 minimizes peak amplitude only, but the method employed is closely related to the method which adds auxiliary carriers and yields minimum distortion components as will be presented hereinbelow. In a converging phase optimization process as carried out by the controller 170, it is desirable to generate as many independent parameters to guide the optimization process as there are degrees of freedom to be controlled. In an N carrier system, e.g., an 81 carrier CATV system, with fixed amplitudes, there are N phase values, that is, N degrees of freedom. Therefore, N variables derived from the behavior of the peak amplitude resulting from combining the carriers are preferred. These variables should provide an indication as to the magnitude and direction of phase change needed in each carrier, or channel, in order to reduce the peak amplitude excursions.

The approach used by the controller 170 of FIG. 4 is to generate N "direction" phasors by clipping the composite, multicarrier signal such that -distortion terms falling on each carrier essentially provide the information as to the magnitude and direction in which each carrier's phasor has to move in every iteration of the process. This approach is effective in coherent systems, as all relevant clipping distortion components are coherent with the carriers to be controlled. A sample of the composite signal is clipped externally, thus causing no side effects to the output signal.

It is a well known fact that phase increments in the signal components of a composite signal at the output of a linear system are equal to the corresponding phase increments introduced at the input of the linear system. This fact is generally not true of a nonlinear system. Therefore, assuming a known phase increment is introduced to the phase of every carrier in the harmonically related composite signal which is subjected to the nonlinear clipping by a limiter, one would not, in general, expect that the resultant phase increments of these carriers at the limiter's output would be identical to those introduced at the limiter's input. The difference between the two is due to a clipping distortion term and thus indicative of the phase direction for which peak amplitude is reduced, or clipped. This principle governs the operation of the controller 170 shown in FIG. 4.

The controller 170 in FIG. 4 is a modification of an existing head-end 102 (FIG. 1) such as the one described by Switzer, et al. The controller 170 includes a control unit 172 to control the operation of the other controller functions. The control unit 172 preferably comprises the combination of a microprocessor (not shown) and a digital signal processor (DSP) (not shown). The combination of a microprocessor and DSP may be embodied as a single unit such as, for example, a Texas Instruments TMS30C30. The control unit 172 generates signals indicative of incremental phase changes for each carrier across a phase control line 174 to a phase variable comb generator 176. The microprocessor controlled phase variable comb generator 176, unlike standard comb generators, provides a set of N phase reference lines 178. Each phase reference line 178 carries a frequency signal corresponding to a cable television carrier. The phases of the signals generated by the comb generator 176 are individually controlled by the microprocessor of the control unit 172.

As shown in FIG. 4, the phase reference lines 178 are connected to a set of phase-locked modulators 180. For example, the phase reference line carrying the reference carrier for channel 2 is connected to the modulator labeled "modulator 1" 180a, channel 3 is connected to the modulator labeled "modulator 2" 180b and channel 81 is connected to the modulator labeled "modulator N" 180c. The signals indicative of program sources for each channel are conveyed to the modulators 180 on a set of program source lines 181. As an example, channel 2 may be broadcasting the movie classic "Gone with the Wind". Hence, the program source line 181a will carry video and audio signals that will, after modulation, distribution and demodulation, direct the operation of a television receiver tuned to channel 2 so that the end user 116 (FIG. 1) is thereby entertained.

The program source signals transmitted across lines 181 are up-converted at the modulators 180 by amplitude modulating the carrier frequencies supplied by the comb generator 176. To maintain coherence among the underlying carriers, the modulators 180 are phase-locked, each to its corresponding phase reference signal. That is, the phase of the output signal is nominally maintained in a fixed relationship with that of the corresponding phase reference signal as described in Switzer (1975). However, slow drifts in the relative phase is specifically accommodated by the present invention.

The modulated carriers produced by the modulators 180 are combined into a multichannel carrier by a combiner 182. The resultant multichannel carrier is output by the head-end 102 (FIG. 1) across CATV links such as optical fiber and/or coaxial cable where all program channel information is available to a television receiver after down-converting to normal broadcast frequencies. The composite signal leaving the head-end 102 is monitored by the controller 170 across a monitor line 184. The monitor line 184 communicates the composite signal to a limiter 186 having a nonlinear transfer function. This nonlinear limiter (NL1) 186 is a "soft" limiter clipping at level $C_l$ meaning that the input-output transfer characteristic is linear up to amplitude magnitude level $C_l$. The value $C_l$ is electronically adjusted by the control unit 172 using soft limit control line 188. As an example, a limiter module such as a WJ-LI supplied by the Watkin Johnson Company of Palo Ato, CA may be used for NL1 186. Preferably, the value of $C_l$ is set for near optimal peak amplitude such that $C_l$ approximates $N^{\frac{1}{2}}$ times the amplitude of a single carrier.

The composite signal output from the nonlinear limiter 186 comprising a set of nonlinearly derived signals is fed across a phasor analyzer input line 189 to a broadband phasor analyzer 190, which is capable of sequentially measuring in-phase (I) and quadrature (Q) components $v_I$ and $v_Q$ at each frequency and feed the result as a phasor $V_j = (v_I, v_Q)_j$ for each channel j to the control unit 172 across the phasor signal line 192. Hence, the phasor analyzer 190 obtains N phasors $\{V_1, V_2, \ldots, V_N\}$ collectively denoted by an N dimensional vector V. These phasors at the output of the nonlinear limiter 186 are expressed in a coordinate system determined by the phase reference signals received from the phase variable comb generator 176 across the lines 178 that feed channel specific phase detectors in the phasor analyzer 190. The control unit 172 selectably receives a phasor corresponding to a unique channel, or carrier, by the use of a channel selection line 194 connected to the phasor analyzer 190. The in-phase or quadrature component of a selected phasor is selectably received by the control unit 172 by the use of a I/Q selection line 196 connected to the phasor analyzer 190.

Figure 5:
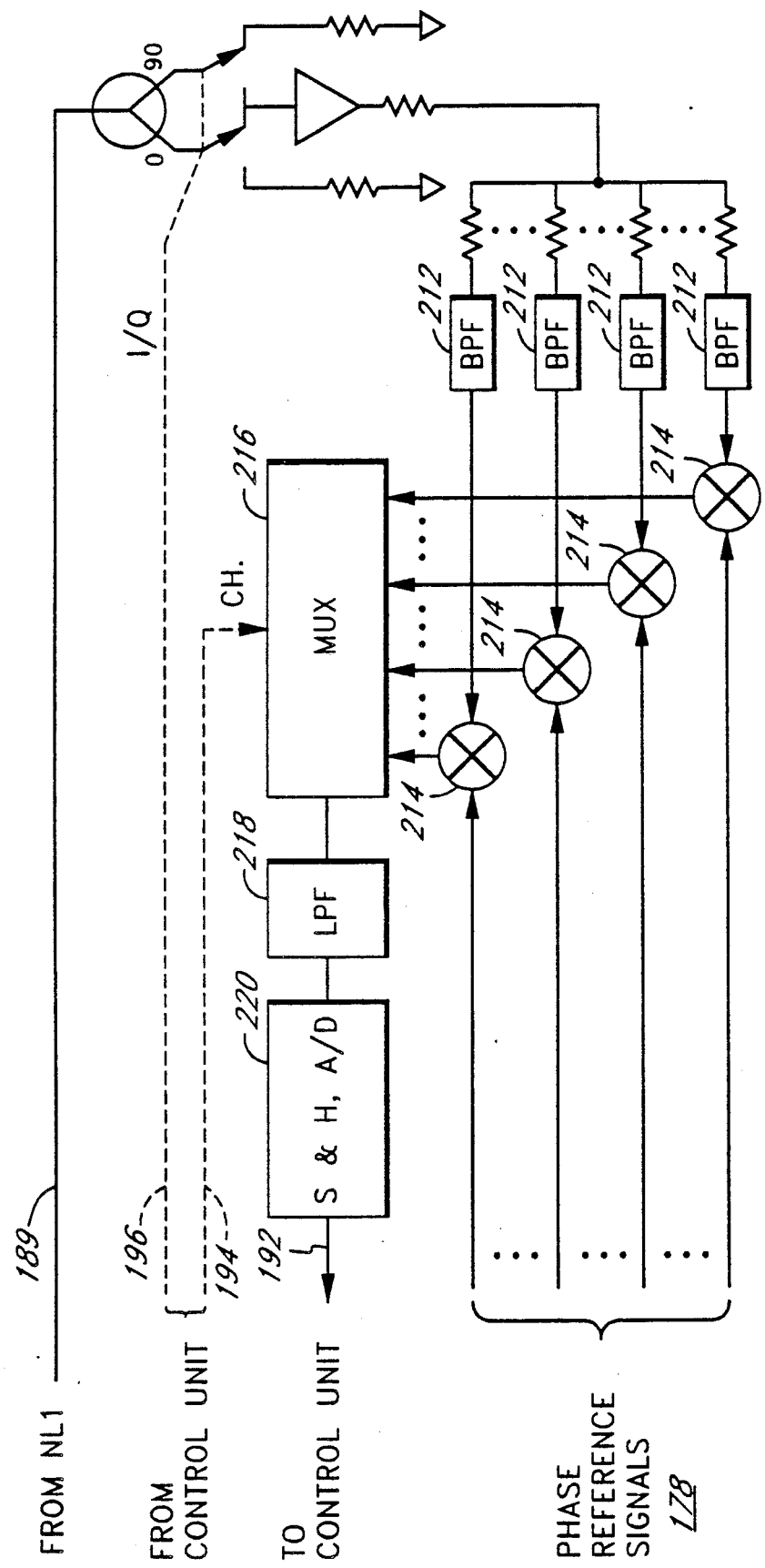
FIG. 5 is a circuit diagram of one preferred embodiment of the phasor analyzer shown in FIG. 4.

FIG. 5 is illustrative of a preferred embodiment for the phasor analyzer 190 shown in FIG. 4. The phasor from the limiter 186 (FIG. 4) to the phasor analyzer 190. The clipped composite signal is split into either an in-phase or a quadrature component by a wideband quadrature splitter 210 controlled by the I/Q selection line 196. The output of the quadrature splitter 210 is then split into multiple carrier frequencies by a set of bandpass filters 212, each centered about the corresponding reference signal frequency. The bandpassed signals are provided to a set of phase detectors 214 which compare the phases of the bandpassed signals with the corresponding reference phases received via phase reference lines 178. A signal from one phase detector 214 is selected by a multiplexer 216 which is controlled by the channel selection line 194. The selected signal is then filtered through a lowpass filter 218 and digitized by an analog-to-digital converter 220. The digitized in-phase and quadrature components are transferred to the DSP in the control unit 172 (FIG. 4) by the phasor analyzer output line 192.

Figure 6:
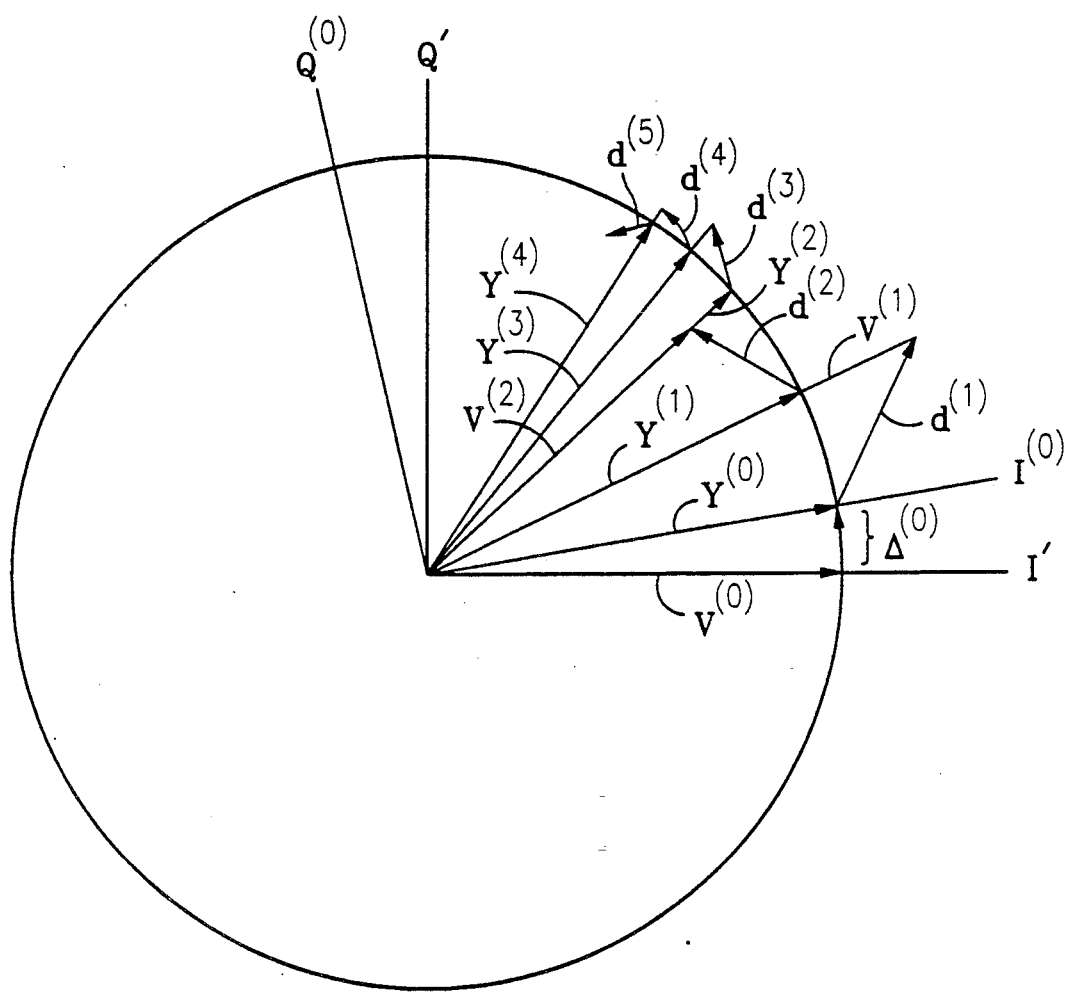
FIG. 6 is a phasor diagram showing an example of the phase convergence performed by the controller shown in FIG. 4.

Reference is now made to FIG. 6 which pictorially describes the operation of the coherent multicarrier controller 170 of FIG. 4 by way of example. FIG. 6 shows a phasor diagram on a fixed coordinate system I'-Q'. The phasor quantities measured by the phasor analyzer 190, which are successively incremented due to phase increments caused by the phase variable comb generator 176 in response to calculations performed by the DSP in the control unit 172, are shown in FIG. 6. Although FIG. 6, as a two-dimensional illustration, can be considered as showing the successive variations of only one phasor, it should be recognized that N such diagrams, one for each channel, can also be considered to be represented by the diagram of FIG. 6. The steps shown in FIG. 6 apply for all N phasors and as such it may be viewed as an N-dimensional phase space.

Figure 7:
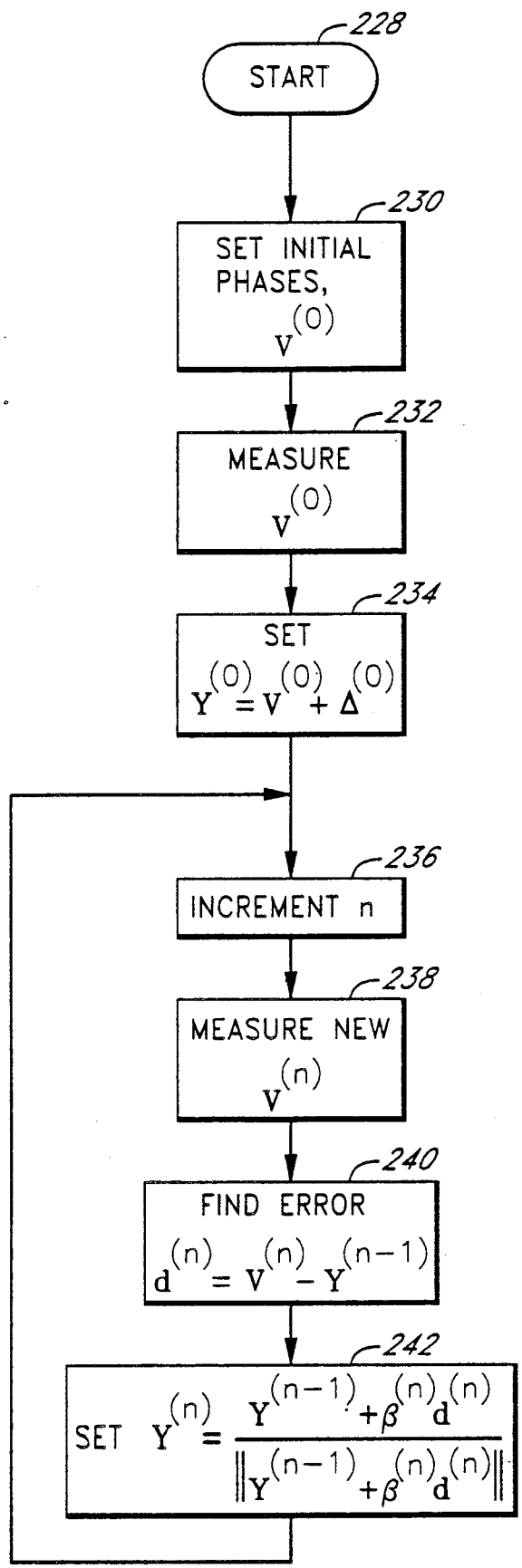
FIG. 7 is a flow diagram showing the steps of the phase convergence process as performed over time by the coherent controller shown in FIG. 4.

The phase analysis and increment process illustrated in FIG. 7, entered at a state 228, begins at an initial arbitrary phase state on the line 189 (FIG. 5) at the output of the limiter 186 (FIG. 4). The initial output signal, denoted by the vector of carrier phasors $V^{(0)} = \{V^{(0)}1, V^{(0)}2, \ldots, V^{(0)}N\}$, is set as indicated at a state 230. In the controller 170 (FIG. 4) a state 230 corresponds to the control unit 172 setting the reference phases driving the modulators 180 and phase detectors 214 (FIG. 5) in the phasor analyzer 190. The control unit 172 initializes reference phases by, for example, transmitting a random phase vector across the phase control line 174 to the phase variable comb generator 176. In this embodiment, N phase values would thus be transferred. As shown by a state 232, the resultant carrier phasors are measured by the phasor analyzer 190 and fed on the line 192 to the control unit 172 where they are stored by the DSP. The values of these carrier phasors are denoted by $V(0)$ This establishes the initial phasor coordinate system of the phasor analyzer 190, shown in FIG. 6 as I'-Q'.

Next, at a state 234, a predetermined arc vector increment $\Delta^{(0)} = \{\Delta^{(0)}1, \Delta^{(0)}2, \ldots, \Delta^{(0)}N\}$ is used by the DSP of the control unit 172 to increment all the phases of the phase variable comb generator 176 causing the output phase of the modulators 180 to track and increment accordingly. It is noted here that the application of the arc vector increment $\Delta^{(0)}$ to the comb generator 176 causes the phasor coordinate system therein to rotate. The parameter $\Delta^{(0)}j$ should be a relatively large arc vector (corresponding to phase increments) such as, for example, 15 degrees for each carrier.

As a consequence of rotating the phase of the signals generated by the comb generator 176, the coordinate system for the pahsor analyzer 190, as defined by signals on phase reference lines 178, is also rotated by the same angular quantity $\Delta^{(0)}$. this rotation is shown in FIG. 6 by the new $I^{(0)}$-$Q^{(0)}$ coordinate system.

Now, for the sake of understanding the operation of the controller 170 of FIG. 4, if one assumes that the clipping level $C_l$ of the limiter 186 is set sufficiently high as compared to the composite signal, the phasors feeding the phasor analyzer 190 would have the value of $Y^{(0)}$ shown in FIG. 6. The value $Y^{(0)}$, being important for the operation of the controller 170, is calculated by the DSP of the control unit 172 according to $Y^{(0)} = V^{(0)} + \Delta^{(0)}$. This equation, shown in state 234, is an expression of the well known fact that the phase increments of the composite signal at the output of a linear system are equal to those introduced at the input of the linear system. That is, no change in the output of the phasor analyzer 190 is expected when there is no distortion in the composite signal at the phasor analyzer input line 189.

However, in the controller 170 (FIG. 4), the level $C_l$ in the limiter 186 is set to a sufficiently low value so that clipping occurs. In general, clipping distortion components will fall on each carrier coherently since the carriers are harmonically related. This well known result was discussed in all of the references by Switzer cited herein. As shown in FIG. 6, clipping distortion therefore contributes a coherent distortion vector $d^{(1)} = \{d^{(1)}_1, d^{(1)}_2, \ldots, d^{(1)}_N\}$ at the line 189.

At this point, the DSP of the control unit 172 moves to a state 236. In the state 236, the iteration counter n is incremented to $n = 1$. Thus, when a new multicarrier phasor is measured at a state 238, the distorted signals introduced by the limiter 186 (FIG. 4) are added to the rotated phasor $Y^{(0)}$ to obtain a measured phasor of $V^{(1)} = Y^{(0)} + d^{(1)}$, shown in FIG. 6.

The DSP in the control unit 172 next moves to a state 240. In state 240, knowing the measured phasor $v^{(1)}$ fed from the phasor analyzer 190 and the calculated phasor $Y^{(0)}$, the DSP obtains a measurement of $d^{(1)}$ as the difference. The N dimensional difference vector $d^{(1)}$ will now constitute a direction vector for incrementing all carrier phases at the next iteration. The control unit 172 is now able to use the difference vector $d^{(1)}$ to set new channel phasors given by $Y^{(1)}$ as follows:

$$Y^{(1)} = \left\{ \frac{Y_1^{(0)} + d_1^{(1)}}{\|Y_1^{(0)} + d_1^{(1)}\|}, \frac{Y_2^{(0)} + d_2^{(1)}}{\|Y_2^{(0)} + d_2^{(1)}\|}, \ldots, \frac{Y_N^{(0)} + d_N^{(1)}}{\|Y_N^{(0)} + d_N^{(1)}\|} \right\} \quad (1)$$

where the norm $|\cdot|$ corresponds to the magnitude of the phasor given by $|V| = (v_I + v_Q)^{\frac{1}{2}}$. The normalization for each component is indicative of the fact that only phase changes are affected in the signals of the phase reference lines 178.

Although not shown in FIG. 6, in general, the error vectors $d^{(n)}$ are used only as a direction indicator while the actual step sizes for each iteration may be adjusted by making incremental phase changes in accordance with $\beta^{(n)} d^{(n)}$ where $\beta^{(n)} > 0$. The constant of proportionality, $\beta^{(n)}$ may be adaptively chosen in accordance with an appropriate adaptive convergence scheme. Thus, the larger the value of $\beta^{(n)}$ the faster the convergence up to the limit that will guarantee stability. Intuitively, the constant of proportionality $\beta^{(n)}$ is a kind of a relaxation constant affecting the dynamics of the convergence.

The general iterative phasor changes are made at a state 242 in FIG. 7 according to the following equation:

$$Y^{(n)} = \left\{ \frac{Y_1^{(n-1)} + \beta^{(n)} d_1^{(n)}}{\|Y_1^{(n-1)} + \beta^{(n)} d_1^{(n)}\|}, \frac{Y_2^{(n-1)} + \beta^{(n)} d_2^{(n)}}{\|Y_2^{(n-1)} + \beta^{(n)} d_2^{(n)}\|}, \ldots, \frac{Y_N^{(n-1)} + \beta^{(n)} d_N^{(n)}}{\|Y_N^{(n-1)} + \beta^{(n)} d_N^{(n)}\|} \right\} \quad (2)$$

This new increment, in turn, will result in a rotation of the phasor coordinate system to $I^{(1)}$-$Q^{(1)}$ (not shown), wherein the $I^{(1)}$ axis coincides with the phasor $V^{(1)}$. As a result, the phasor analyzer 190 would measure $V(2)$, again with an offset $d^{(2)}$ due to the clipping. This can be seen in FIG. 6. Thus, in the recursive process of FIG. 7, the nonlinearity introduced by the limiter 186 (FIG. 4) is the key factor in causing convergence to a steady state. Effective convergence takes place when the detected tangential components of the increments $d^{(n)}$ become too small compared with the resolution of the phasor analyzer 190.

Two situations may give rise to this convergence. The first is that, as intended, the peak amplitude reduced to the limiting level $C_1$, whereupon the distortion terms nearly vanish. The second is that all non-vanishing distortion components point in a radial direction, so that no tangential components are present to cause continued phase increments. It turns out that the latter condition only occurs when the level $C_l$ set too low compared to the minimum amplitude attainable. In general, by selecting $C_l$ to be close to the optimal peak amplitude, one can achieve convergence to an optimal phase condition in several thousand iterations of are process shown in FIG. 7. Fortunately, the controller 170 provides an automated method of determining convergence status or whether the value of $C_l$ is set too low without having to measure the peak amplitude. This is accomplished by making use of the $V^{(n)}$ measurements made by the phasor analyzer 190 as discussed below.

During normal operation of the controller 170 (FIG. 4), where the value of $C_l$ is set for clipping operation, among other quantities, the DSP of the control unit 172 forms for each iteration (n) the following quantities:

$$\|V^{(n)}\|^2 = \sum_{j=1}^{N} \|V_j^{(n)}\|^2 = 2P_{Cl}^{(n)} \quad (3)$$

$$\|d^{(n)}\|^2 = \sum_{j=1}^{N} \|d_j^{(n)}\|^2 \quad (4)$$

$$\epsilon^{(n)} = \frac{\|d^{(n)}\|^2}{\|V^{(n)}\|^2} \quad (5)$$

Equation (3) defines the square of the magnitude of the clipped phasor vector which is twice the clipped power $P_{cl}^{(n)}$ of the multicarrier signal. Note that the clipped power will always be less than the unclipped power $P_s$. Equation (4) defines the square of the magnitude of the distortion phasor vector. In Evaluation (5), the value of $\epsilon^{(n)}$ is a kind of distortion to signal ratio indicative of the state of convergence of the controller 170 and it stabilizes at a sufficiently low value at steady state, depending on the resolution of the system.

At some infrequent rate, $C_1$ is set to its maximum level, (non-clipping conditions, for the phasor analyzer 190 to perform a calibration routine. Note that this condition would not cause any change in the state of the system, as there are no distortion components to increment any of the phases. Therefore, the calibration step may be interjected before state 238 of FIG. 7 every several thousand steps of incrementing n. The phasor analyzer 190 thus obtains a measurement of an unclipped phasor V and transfers the values to the DSP of the control unit 172 for storage and processing. The DSP therefore has a representation of the power of each carrier and total power in the unclipped signal in terms of the coordinate system of the phasor analyzer 190 by making a calculation as follows:

$$P_s = \frac{1}{2} \sum_{j=1}^{N} \|V_j\|^2 \quad (6)$$

Then, using Equation (6) and by using the most recent quantities of Equation (3) under the aforementioned steady state conditions, the following "constraint coupling" indicator is derived:

$$\Delta P^{(n)} = \frac{P_s - P_{Cl}^{(n)}}{P_s} \quad (7)$$

Large coupling indicators are associated with too aggressive clipping values for $C_1$ and thus if $\Delta P^{(n)}$ is found to be above a preset high threshold THH (e.g., $-30$ dB), the control unit 172 (FIG. 4) causes $C_l$ to increase by some increment $dC_l$ and the iterative process described in FIG. 7 is allowed to continue. Similarly, if the coupling is too low, say lower than a preset low threshold THL (e.g., $-50$ dB) $C_l$ is decremented and the process of FIG. 7 is continued. The response of the controller 170 to these incremental level changes in $C_l$ can be used by the DSP to derive independent estimates of the current value of the peak amplitude constant of proportionality, as well as verify the optimally of the state of the controller 170.

At this point it should be noted that the algorithm for the controller 170 (FIG. 4) described and shown in FIG. 7 is robust and, in simulations, proved effective under various signal conditions. The algorithm works equally well for carrier assignments with unequal amplitudes. Furthermore, once arriving at a steady state, it can track slow drifts in amplitude levels or an omission of any number of carriers. It turns out that convergence to equally optimal states can be achieved and maintained during amplitude modulations of the carriers as long as their modulation depths do not exceed 100%. It should be noted, however, that some of the calibration estimates must be done over longer periods of time so as to reduce the variance of these estimates due to modulations. Alternatively, video frame synchronization can be utilized so that calibration and convergence can be performed at higher rates, say, during the Vertical Blanking Intervals of the television signal, where all carriers have fixed high amplitude. On the other hand, assuming extremely low phase noise in the phase variable comb generator 176 (FIG. 4), each iteration step in the process of convergence or calibration estimates can be taken over many seconds so that the phasor analyzer 190 performs integration over longer periods of time obviating the need for frame synchronous operation. Fortunately, present low phase noise synthesis techniques offer such an advantage.

Figure 8:
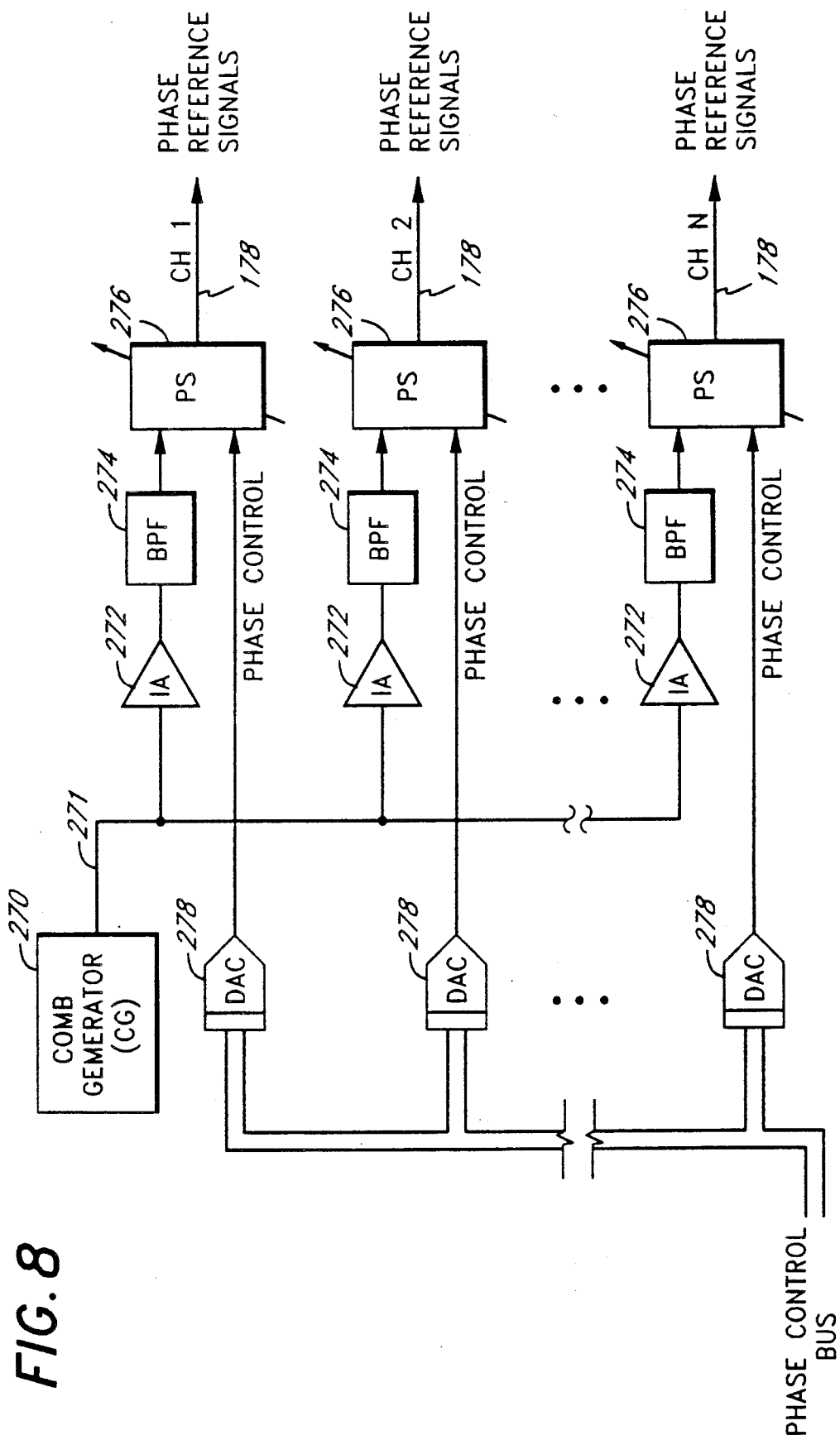
FIG. 8 is a block diagram of one preferred embodiment of the phase variable comb generator shown in FIG. 4.

FIG. 8 illustrates one preferred embodiment of the phase variable comb generator 176 shown in FIG. 4. In establishing arbitrary phase values for the reference frequencies that drive the coherent head-end modulators 180 (FIG. 4), it is important to provide phase control means that offers stable and rigid intercarrier phase relationships and the ability to accurately provide phase increments as small as a fraction of a degree for each carrier. The need for these smaller phase increments arise at the final convergence stages of the feedback process described above with reference to FIG. 7. Furthermore, it is important to note that for proper operation of the controller 170, phase increment cross-talk between the individual reference signals must be kept to a minimum, that is, to a level well below the incremental phase resolution of the controller 170. This is because of the fact that if the aggregate cross-talk dominates the true increment required for each iteration step, the intended phase increment direction and magnitude would be perturbed, thereby preventing convergence of the process to the optimal phase setting.

The phase variable comb generator 176 shown in FIG. 8 includes a standard comb generator (CG) 270. The comb generator 270 feeds carrier frequencies across a line 271 to a set of isolation amplifiers (IAs) 272 followed by a set of bandpass filters (BPFs) 274 and a set of voltage controlled phase shifters (PSs) 276. The bandpass filters 274 and the isolation amplifiers 272 are required in order to ensure that phase increment crosstalk due to impedance variation of each phase shifter 276 in response to varying the phase control voltage, would not affect the phase at the input to the other phase shifters 276.

The comb generator 270 generates a periodic waveform which contains all harmonics of the fundamental frequency and it may employ a step recovery diode type sharp impulse generator, or it may be ordered, for example, as model 6105B-HSR from Scientific Atlanta, Inc. of Atlanta, GA. Each bandpass filter 274 is tuned to the appropriate harmonic frequency for which the reference signal is intended. The reference signals are output from the phase shifters 276 on the phase reference lines 178.

The phase shifters 276 are controlled by a set of digital-to-analog converters connected to digital storage latches (DACs) 278, wherein each one of the latches can be separately addressed by the control unit 172 (FIG. 4) across the phase control line 174 and fed with the appropriate digital representation of the phase shift required for that channel. The phase shifters 276 are preferably of the type that is capable of covering the range of 0–360 degrees phase shift. This will allow more margin for offsetting any cumulative phase shifts due to thermal drifts in the modulators, cables and signal combiners at the head-end 102 (FIG. 1). The phase shifters 276 may be, for example, Model PSES-4 sold by Merrimac Industries Inc. of West Caldwell, NJ.

It should be noted that simulations of the preferred embodiment of FIG. 4 reveal that the convergence of the system to an optimal phase setting is established in a manner such that no signal is shifted in phase more than 90 degrees from its arbitrary initial phase value. Therefore, theoretically 0–180 degrees phase shifters may be utilized. However, center calibration would be required and very little phase drift margin would be available.

Figure 9:
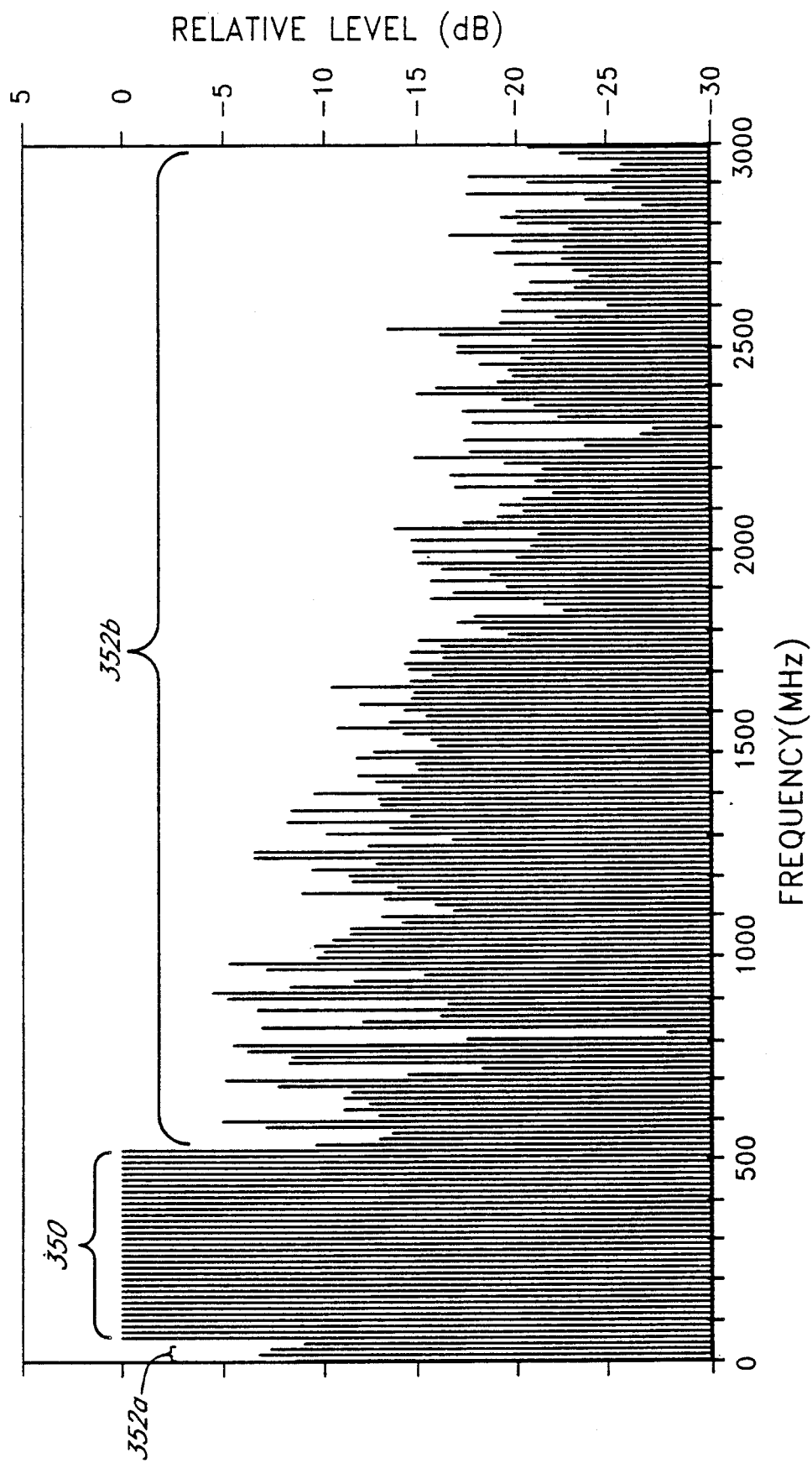
FIG. 9 is a graphical diagram of the power spectrum of a bilevel multichannel composite signal having auxiliary

Further improvements can be made to the multicarrier signal generated by the controller 170 of FIG. 4 if auxiliary carriers are added to the signal. FIG. 9 is the power spectrum, or Fourier analysis, of one such simulated signal. The horizontal axis represents frequency in Megahertz (MHz) and the vertical axis represents relative signal power in dB.

An unmodulated multicarrier signal having 81 channels or in-band carriers 350, each of unit amplitude, is shown when combined with auxiliary carriers 352 comprising below-band carriers 352a and above-band carriers 352b. Most of these auxiliary carriers were generated by nonlinearly processing the optimally phased 81 carriers composite signal. Auxiliary carriers 352 are thus added both below and above the in-band carriers 350, although it can be shown that the penalty for not using the bottom eight auxiliary carriers 352a is rather small.

The in-band carriers 350 shown in FIG. 9 represent a harmonically related coherent (HRC) carrier system starting at the 9th harmonic of the 6 MHz spacing frequency interval. Although frequencies up to the 500th harmonic are shown, simulations indicate that the efficacy of the approach would not be significantly affected if the aboveband auxiliary carriers 352b were limited to frequencies of five times the highest signal frequency in the carriers 350, which, in the 81 channel case, corresponds to 2.7 GHz when the spacing is 6 MHz. Of course, if the multicarrier signal carries less than 81 channels, further reduction in the upper frequency limit of the auxiliary carriers 352 is possible, without appreciable degradation in distortion suppression.

Figure 10:
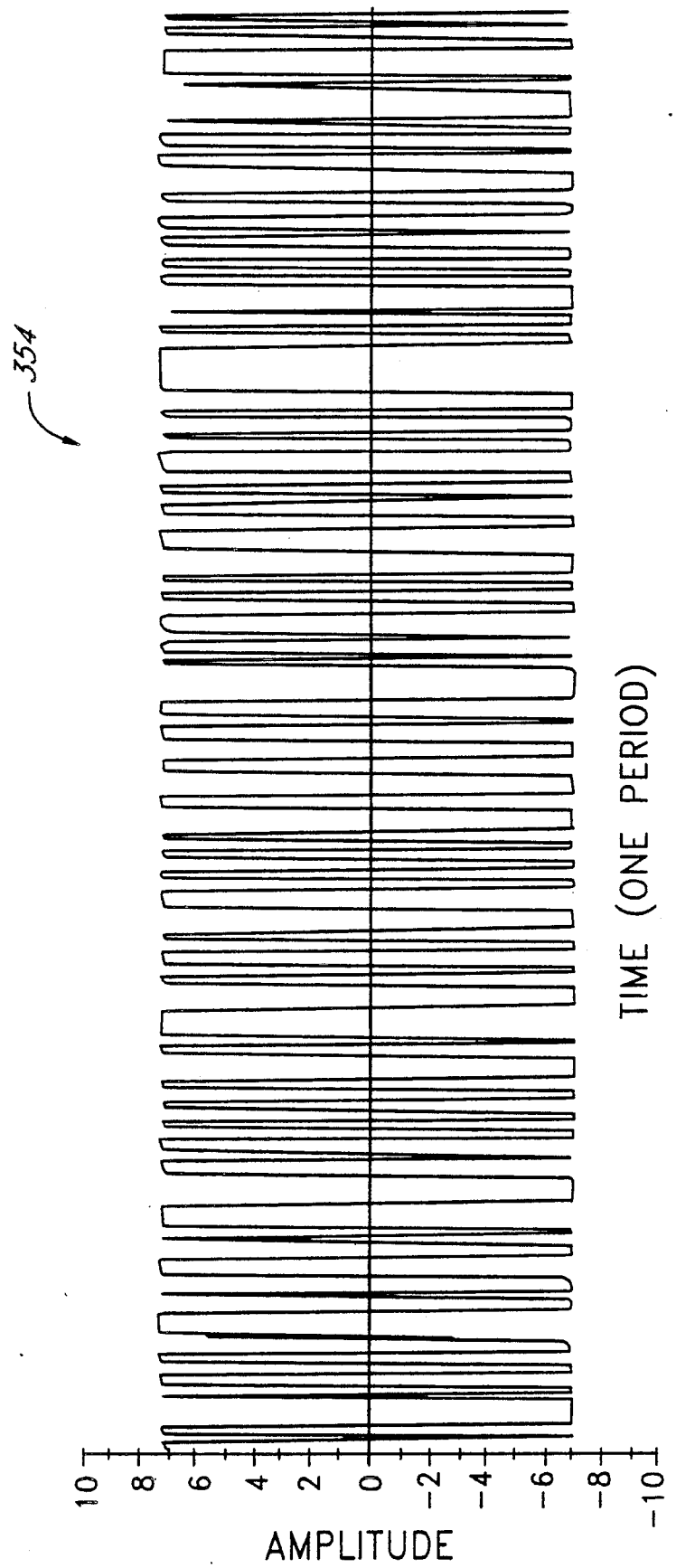
FIG. 10 is a time domain waveform diagram corresponding to power spectrum shown in FIG. 9.

FIG. 10 illustrates a time domain bilevel waveform 354 associated with the power spectrum of FIG. 9. As can be seen, the signal 354 appears rather close to being an optimal "bilevel" signal, i.e., the signal spends most of its time at the +7.3 units and −7.3 units levels. In this way, the transfer characteristics of transducers carrying the signal 354 are effectively operating in a linear way. That is, since the bilevel signal "spends" essentially its entire time on only two points of the transducer transfer characteristic curve, the resultant output cannot be distinguishable from that which would have been encountered by a linear curve passing through these two points. As a result, all even order distortions and composite odd beats can be reduced to an arbitrarily low level. The total energy of the auxiliary carriers 352 (FIG. 9) is approximately 30% of that present in the in-band carriers 350. Yet, as shown by comparing FIG. 10 to FIG. 3, the peak amplitude of the composite bilevel carrier 354 is reduced well below that which could have been achieved without the auxiliary carriers 352.

When modulation is introduced on the in-band carriers 350 of FIG. 9, their instantaneous levels deviate from the average condition under which the phases were optimized. Thus, the amplitude of the composite signal 354 (FIG. 10) will slowly fluctuate. In an AM system such as television modulation, no carrier phase modulation can be introduced since otherwise such modulation would result in video distortion. However, the constant phase restrictions imposed on the signal carriers do not exist for the auxiliary carriers. In principle, as the inventor has mathematically proven, a transmission system has the ability to instantaneously process the signal carriers and derive auxiliary carriers, and the latter, as a result, generally will be AM and phase modulation (PM) modulated, and they can be combined with the signal carriers to yield a bilevel signal. The amplitude of the signal will fluctuate, but in principle, it can substantially maintain its bilevel property if the modulations are slow compared with the fundamental period of the composite signal.

Figure 11:
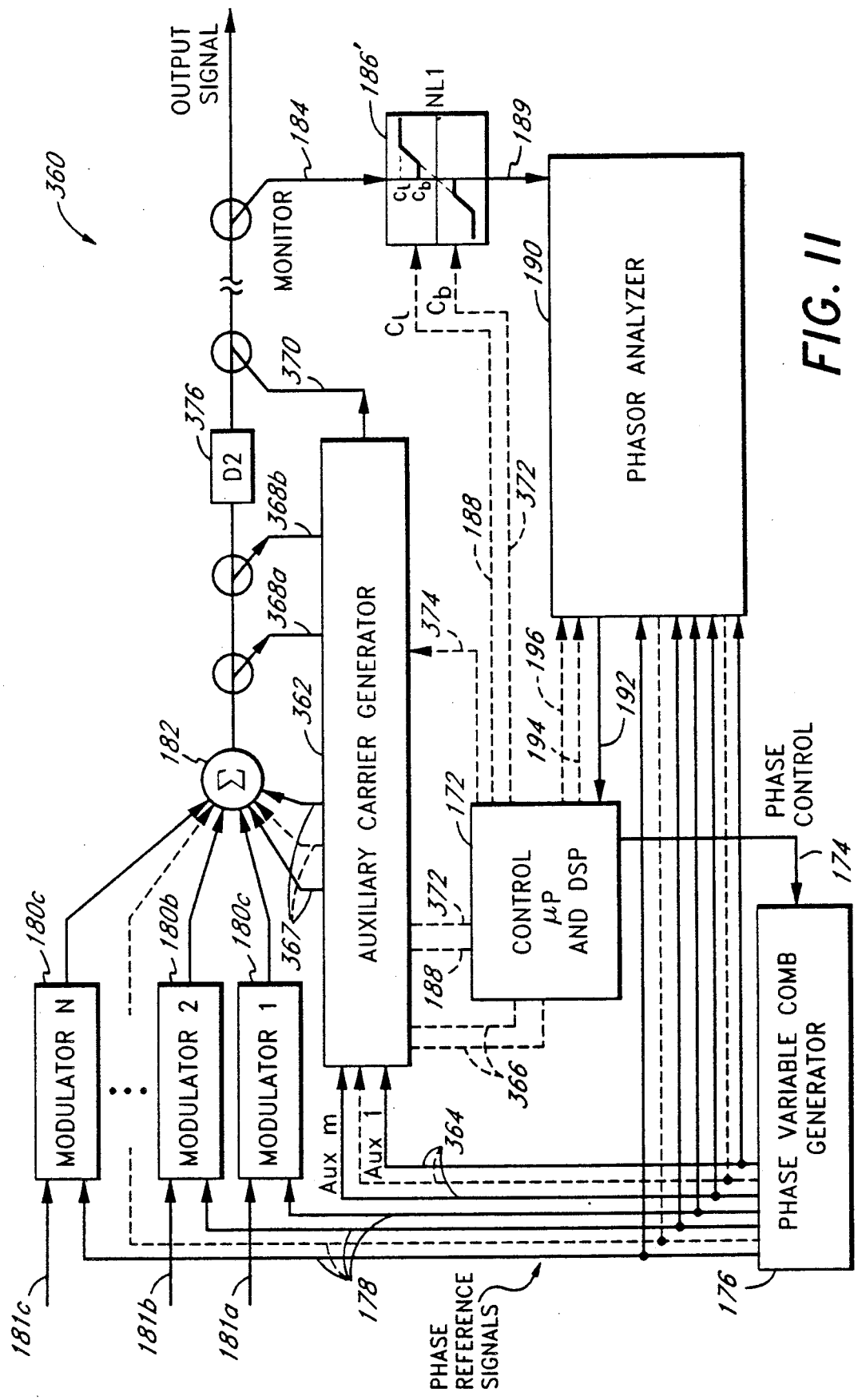
FIG. 11 is a block diagram of one preferred embodiment of a bilevel multicarrier controller of the present invention.

FIG. 11 illustrates a preferred embodiment of a coherent multicarrier controller with auxiliary carriers, or bilevel multicarrier controller 360 that is used to generate bilevel multicarrier signals such as the example shown in FIG. 10. The chief structural differences between the bilevel controller 360 and the coherent controller 170 (FIG. 4) are the addition of an auxiliary carrier generator 362 and the substitution of a modified limiter NLI 186' for the limiter 186 of FIG. 4.

In the bilevel controller 360 of FIG. 11, the control unit 172 controls the phases of the signals carried on the phase reference lines 178 and, in addition, a set of m auxiliary phase reference lines (Aux 1—Aux m) 364 emanating from the phase variable comb generator 176. The signals on the auxiliary phase reference lines 364 are generated and controlled in the same manner as the phase reference lines 178 shown in FIG. 8. The amplitudes of the signals on the various auxiliary lines 364 are manipulated by a set of m auxiliary carrier amplitude control lines 366 also managed by the control unit 172. These synthesized auxiliary frequencies are then output by the auxiliary carrier generator 362 on a set of lines 367 where they are combined in the combiner 182 with the in-band cable television frequencies generated by the The multicarrier signal output from the combiner 182 is fed into the auxiliary carrier generator 362 on multicarrier lines 368a and 368b. A nonlinearly processed multicarrier signal producing further auxiliary carriers is output from the generator 362 on a nonlinearly derived auxiliary carrier line 370.

A modified clipping function of limiter 186' is controlled from the control unit 172 using the soft limiter control line 188 controlling the limit level $C_l$, previously discussed, and a "hard" limiter, or slicer, control line 372 controlling the slicer output level $C_b$. The level $C_b$ governs the magnitude of the slicing output level of the nonlinearly processed multicarrier signal.

The voltage transfer characteristics of the modified limiter 186' is shown schematically in the limiter block labeled as NLI 186' of FIG. 11, wherein the horizontal axis corresponds to the input voltage, while the vertical coordinate corresponds to the output voltage. As can be seen in this diagram, the output voltage of limiter 186' is restricted to have magnitudes between the slicer output level $C_b$ and the limiter level $C_l$. The output signal is equal to the input signal whenever the magnitude of the input signal is less than $C_l$ and greater than $C_b$. Otherwise, the magnitude of the output signal is equal to the limiter value $C_l$ whenever the magnitude of the input signal is no less than Cl, and equal to $C_b$ whenever the magnitude of the input signal is no more than $C_b$, whereupon the output signal sign is the same as that of the input signal. The output slicer level $C_b$ is adjusted to be no more than the limiter output level $C_l$. Thus, as the slicer output of the limiter device 186, approaches a bilevel signal.

Although not necessarily always the case, in the embodiment shown in FIG. 11, the limiter and slicer control lines 188, 372 are also used to control a nonlinear limiter device similar to limiter 186' contained within the auxiliary carrier generator 362 described below. The gain of the signals fed into the nonlinearly derived auxiliary carrier line 370 is adjusted by the control unit 172 using a gain control line 374. Since time delays occur between the multicarrier signal and the nonlinearly derived auxiliary signal, which are combined at the termination of the line 370, a wideband delay line D2 376 is inserted in the output of the combiner 182 to eliminate timing differences between the signals.

Figure 12:
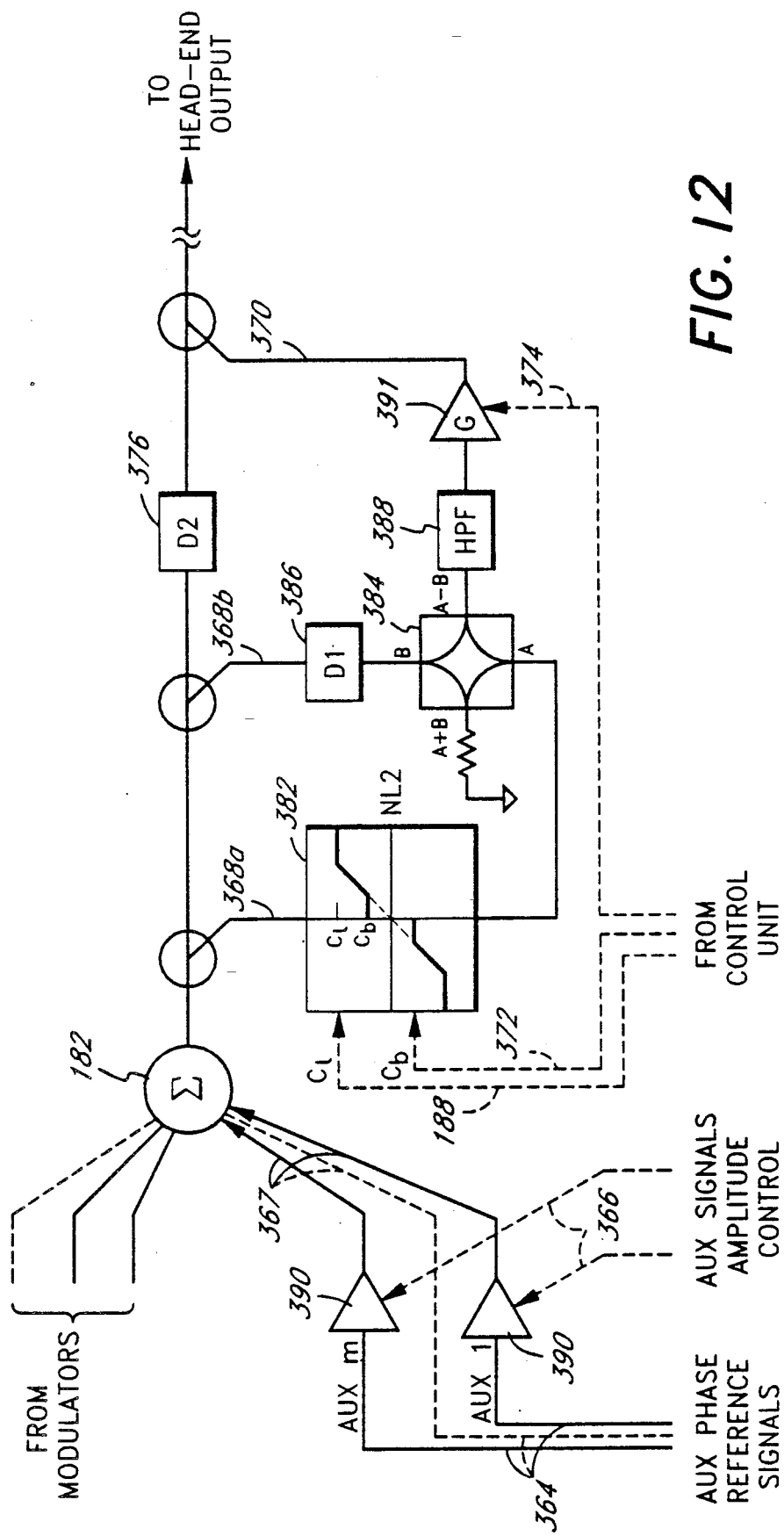
FIG. 12 is a circuit diagram or one preferred auxiliary carrier generator shown in FIG. 11.

Referring now to FIG. 12, showing the auxiliary carrier generator 362, it is observed that in general one can obtain out-of-band frequency components by clipping and slicing the band limited signal supplied by the modulators 180 (FIG. 11). For sufficiently sharp slicing and clipping, these out-of-band signals, for a typical 550 MHz CATV application, will fall in the 550 MHz-4 GHz range. A second nonlinear limiter NL2 382 of a construction similar to that of limiter NL1 186', is used for that purpose and its output is connected to a wideband difference transformer 384, which subtracts in-band frequency components fed through the line 368b from the output of the limiter 382. At lower frequencies, for non-CATV applications, the difference transformer 384 would be replaced by an operational amplifier configured as a difference amplifier. A delay line D1 386 provides a short all-pass delay compensation to allow accurate timing matches between the multicarrier signals fed to inputs A and B of the difference transformer 384.

The residual signal is further filtered out by a high pass filter (HPF) 388. The HPF 388 passes only the higher frequency components above the in-band frequency range, typically 550 MHz for an 80 channel system. Since the transition in the response of the HPF 388 (and hence the amplitude and phase distortion) could span several channels, a correction to the auxiliary signal may be required over that transition band. To that end, synthesized auxiliary signals Aux 1-Aux m are shown to be generated by a set of gain controlled amplifiers 390 receiving unmodulated reference signals from the phase variable comb generator 176 (FIG. 11). Alternatively, both phases and amplitudes can be digitally synthesized in the reference generator 176 for these auxiliary sources. In any event, only 10-20 synthesized auxiliary carriers will typically be required, while the majority of the auxiliary carriers are automatically generated with the proper phase and amplitude by clipping and slicing the composite signal fed into NL2 382.

The auxiliary carrier output can be controlled by a gain controlled amplifier 391. The gain G will typically be set at some fixed value so as to compensate for losses in the limiter NL2 382, difference transformer 384 and high pass filter 388. If G =0 at the gain controlled amplifier 391, turning auxiliary carrier input off, (and the amplifiers 390 are similarly turned off), then the bilevel multicarrier controller 360 essentially operates as the coherent multicarrier controller 170 shown in FIG. 4.

Figure 13:
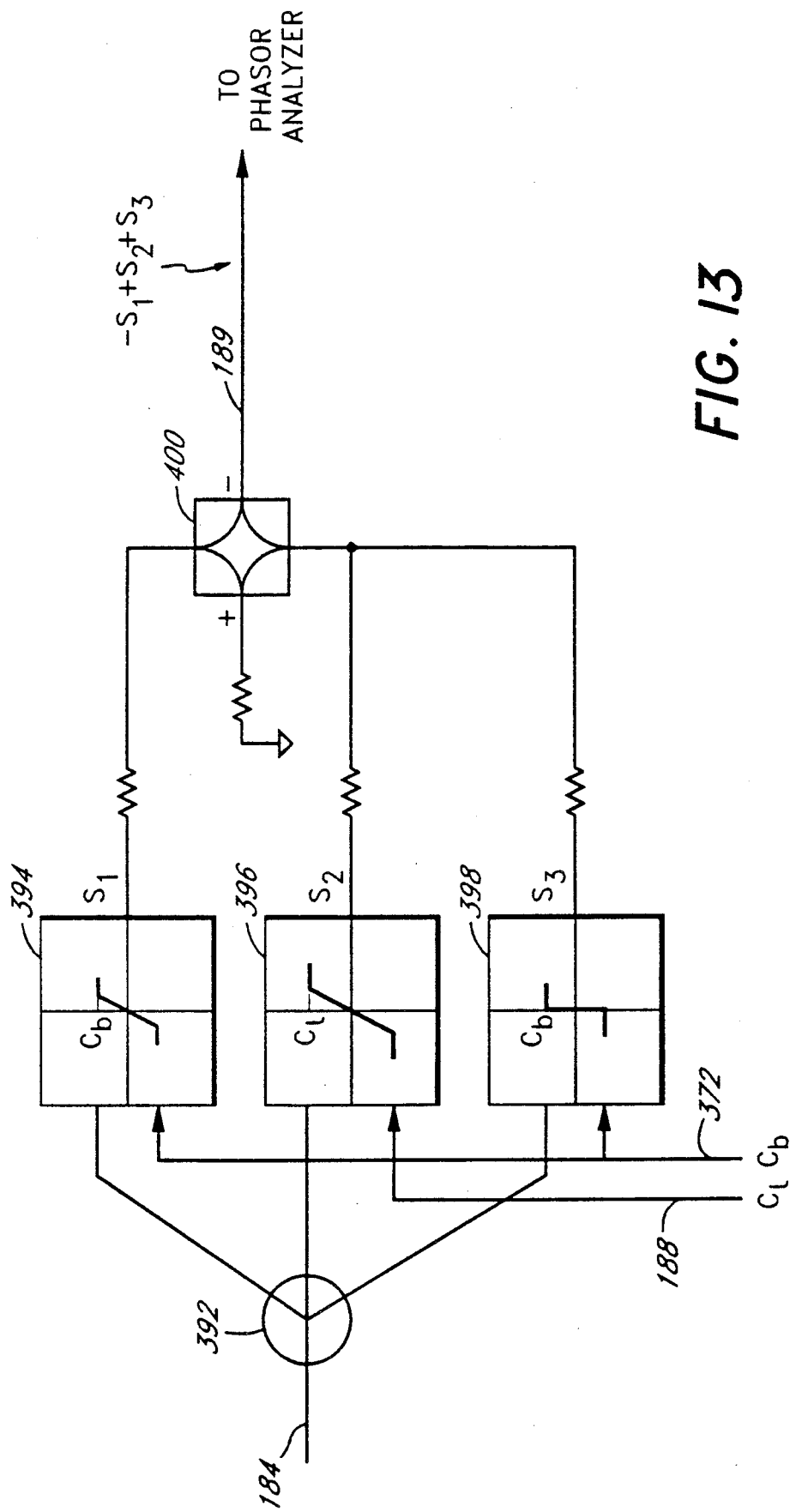
FIG. 13 is a circuit diagram of one preferred nonlinear 1 in FIGS. 11 and 12.

FIG. 13 shows one preferred embodiment of the nonlinear limiters 186' (FIG. 11) and 382 (FIG. 12). The following discussion will specifically refer to the limiter 186', but is equally applicable to the limiter 382. The input to the limiter 186', fed from the monitor line 184, is split by a three-way equal level signal splitter 392 to distribute the multicarrier signal to three building blocks, a pair of limiters 394, 396 and a slicer 398 having different nonlinear transfer curves. The curve limits are controlled by the limiter and slicer control lines 188, 372. A difference transformer 400 composes the clipped and sliced signals $S_1$, $S_2$ and $S_3$ into an output signal equal to $-S_1+S_2+S_3$. The resultant voltage transfer curve for the clippers 186, and 382 is graphically depicted in FIGS. 11 and 12.

It should be noted that for proper operation of the assembly constituting the limiters 186', 382, a good match between the levels $C_b$ of the limiter 394 and the slicer 398 must be maintained. Furthermore, the gains, represented by slopes in FIG. 13, through the limiters 394, 396 must be equal. Finally, the delays through all nonlinear devices 394, 396, 398 must be well matched.

The operation of the bilevel multicarrier controller 360 (FIG. 11) is now described by referring to FIG. 14. FIG. 14 is a series of power spectrum diagrams showing the addition of auxiliary carriers to the multicarrier signal in the frequency domain. FIG. 14a shows the coherent information carrying signals from modulators 1-N 180 after being combined in the combiner 182 as a multicarrier signal 410. This signal initially may already be optimized for minimum peak amplitude as in FIG. 3, for example. In a transition band 412 and below in-band frequencies 410, a set of synthesized auxiliary carriers 414a, 414b carried on auxiliary phase reference lines Aux 1–Aux m 364 (FIG. 12), and whose amplitudes are controlled by the gain of the amplifiers 390 (FIG. 12) as set through the control lines 366 (FIG. 11) by the DSP of the control unit 172, are added and the resultant signal feeding the nonlinear clipper NL2 382 is shown in FIG. 14b. It should be noted from the outset, that modest penalties in performance can be traded off by the elimination of the synthesized auxiliary sources 414 while relying solely on the nonlinearly derived auxiliary carriers 418 (FIG. 14d). A frequency response curve 416 of the high pass filter (HPF) 386 is shown in FIG. 14c.

Notwithstanding the theoretical limit, in which the in-band Fourier components of the "sliced" signal can be made to approach the original signal's components arbitrarily, in practical implementations such as that of FIG. 11, the controller 360 removes these nonlinearly processed components that are in-band while adding the remaining components as a set of nonlinearly derived auxiliary carriers 418 (FIG. 14d). The combined signal leaving the head-end 102 (FIG. 1) and feeding the monitoring nonlinear clipper NL1 186' (and perhaps feeding a group of laser transmitters) is shown in FIG. 14e.

Referring now in general to FIG. 11, assume that the controller 360 was allowed to arrive at some low peak amplitude signal without auxiliary carriers as described above (e.g., the signal of FIG. 3) with $C_b=0$ set. Although other control schedules are possible for the nonlinear devices NL1 186' (FIG. 11) and NL2 382 (FIG. 12), it is now assumed that they are jointly controlled such that their respective $C_l$ and $C_b$ values are identical. Keeping $C_l$ at its approximate $N^{\frac{1}{2}}$ times the amplitude of a single carrier of the multicarrier signal value, the control unit 172 gradually increases the value of $C_b$ so as to effect sharper and more "decisive" transitions of the output waveforms about the time axis. The controller 360 reacts to these new constraints by introducing successive phase changes according to Equation (2) in the manner described above, as well as by iteratively producing auxiliary carriers which result from the slicing and clipping of the multicarrier signal 410 (FIG. 14a). The transition band auxiliary carriers Aux 1–Aux m 414b receive the same phase change treatment as do the N modulators 180, but an additional degree of freedom is introduced for them by the ability to individually control their amplitudes. Since the phasor analyzer 190 resolves resulting phases and amplitudes on each frequency, the new phase values can be adjusted on the lines 364 accordingly, while the new amplitudes are set by the amplifiers 390. Thus, the iteration step characterized by the non-normalized version (i.e., amplitudes may be adjusted) of Equation (2) is used for the synthesized auxiliary phasor group collectively denoted by the m dimensional vector $Y_x$ as follows:

$$Y_x^{(n)} = \{Y_{x_1}^{(n-1)} + \beta^{(n)}dx_1^{(n)}, Y_{x_2}^{(n-1)} + \beta^{(n)}dx_2^{(n)}, \ldots, Y_{x_m}^{(n-1)} + \beta^{(n)}dx_m^{(n)}\} \quad (8)$$

where $dx_j^{(n)}$ denotes the incremental phasor error detected by the phasor analyzer 190 on auxiliary carrier j at iteration (n). These calculations are carried out in the DSP of the control unit 172, whereas the phase changes of the $Y_x$ components are affected by the auxiliary phase reference lines 364 (FIG. 11) and their amplitudes are modified via the auxiliary signal amplitude control lines 66. Thus, in the auxiliary carrier mode of operation by the controller 360, the iterative process of FIG. 7 is extended by including phasor components associated with the auxiliary carriers in states 238, 240 and by implementing state 242 for the auxiliary carriers based on Equation (8).

It is important to note that the nonlinearly derived auxiliary carriers 418 (FIG. 14d) are not controlled by this method directly, but are automatically generated in response to the composite signal feeding NL2 382. Hence, unlike the synthesized auxiliary carriers 414b of the transition band 412 which, in the steady state, would have fixed amplitudes and phases, the nonlinearly derived auxiliary carriers 418 would have amplitudes and phases that track the fluctuations in the modulated multicarrier signal in-band 410. Of course, an ideal situation is that in which all auxiliary signals are able to instantaneously vary both in phase and amplitude so as to track the variations in the information carrying, or modulated, signals. However, it may be difficult to construct filters such as the HPF 388 (FIG. 12) having a transition band much smaller than the frequency spacing between the last channel and the adjacent auxiliary signal. In general, such a frequency spacing would be equal to the fundamental frequency.

The results shown in FIG. 10 correspond to a process in which $C_b$ was raised to 7.2 units gradually during several hundred iterations and then reduced to 0 units for the remaining iteration steps, whereupon only top limiting effects contribute to the generation of the auxiliary carriers. In a preferred operation mode, a higher value for $C_b$ may be used whereby slightly higher peak amplitudes may be encountered but with the desired result of further suppressing nonlinear distortions. That is, since a higher $C_b$ necessarily means that sharper transitions occur in the amplitude of the multicarrier signal, slight overshoots may occur in the amplitude but the resulting signal should better approach a bilevel signal.

Figure 15:
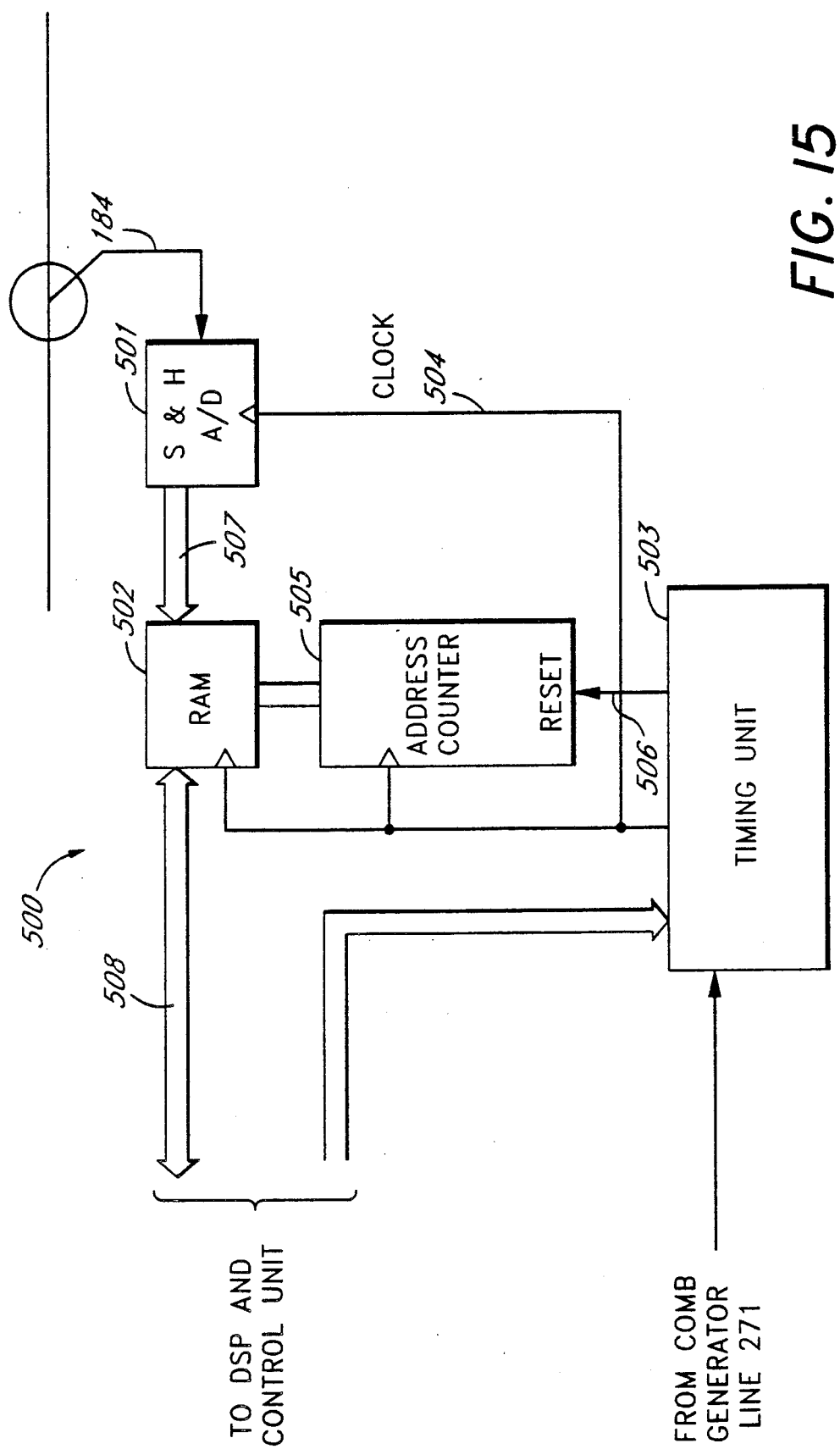
FIG. 15 is a circuit diagram of one preferred digital signal acquisition unit of the present invention.

Reference is now made to FIG. 15, wherein a second embodiment of the phasor analyzer 190 of FIG. 5 and the nonlinear devices 186 (FIG. 4) or 186' (FIG. 11) can be combined in a single digital device termed a signal acquisition unit 500. The signal acquisition unit 500 in combination with the DSP included in the control unit 172 perform the required nonlinear function of limiters NL1 186, 186' as well as the phasor analysis and the calculations required for generating the phasor increments as defined by Equations (2) and (8).

In FIG. 15, the monitored output composite signal is fed through the monitor line 184 to a sample-and-hold and an analog-to-digital converter circuit 501, collectively referred to herein as A/D 501. The A/D 501 is strobed and clocked by a sampling clock signal of fixed frequency Fs present on a line 504. The digital samples acquired by the A/D 501 are sequentially transferred to a RAM memory 502, wherein they are stored at memory address locations determined by an address counter 505. These stored samples can be read by the DSP of the control unit 172 (FIGS. 4 and 11) subsequent to the completion of an acquisition of a predetermined number of samples spanning a time period equal to the fundamental period of the composite signal fed through the monitor line 184, or an integral multiple thereof. The clock signal frequency Fs is phase-locked to a harmonic of the fundamental frequency of the comb generator 270 (FIG. 8), preferably generating sampling time intervals sufficiently small such that the sampled digitized composite signal stored in the RAM 502 is a faithful non-aliased representation of the analog signal at the monitor line 184. The timing unit 503 may contain a phase-lock loop clock signal generator (not shown) which is locked on the comb generator 270 output supplied on the line 271 (FIG. 8). Thus, unlike the phasor analyzer 190 of the first embodiment (FIG. 5), the phase of the clock signal on line 504 is fixed. The phase of the clock signal serves as a phase reference for this second embodiment, and is not affected by the phases of the individual phase reference signals supplied to the modulators.

Subsequent to the acquisition of an array of samples described above, the DSP of the control unit 172 (FIGS. 4 and 11) takes command of the RAM's address and data lines via an address and data multiplexer (not shown) in the RAM memory 502. The nonlinear function of either of the limiters 186, 186' is performed on these samples by the DSP 172 and stored in the RAM 502. Here, the values of $C_b$ and $C_l$ are computationally controlled by the software version of the nonlinear function implemented by the DSP 172. Subsequently, a Fast Fourier Transform (FFT) is implemented in the DSP 172 on the nonlinearly processed digitized array stored in the RAM 502. Because the clock signal and the individual signal components comprising the sampled composite signal are harmonically related, the resultant Fourier coefficients, characterized by an amplitude and phase, will represent the phasors for each carrier in the composite signal, denoted previously by the vector $V^{(n)}$ or by its auxiliary carrier counterpart $Yx^{(n)}$. Therefore, the algorithm described earlier with reference to FIG. 7 can be implemented.

The timing unit 503 contains various timing chain counters in communication with the control unit DSP 172, so that periodically, for example at each iteration depicted in FIG. 7, whereupon n is incremented, the address counter is reset by a reset line 506 so as to enable an acquisition of a new record of the composite signal for subsequent phasor estimation by the FFT process described above.

As indicated above, due to the phase coherency of the sampling clock signal, the number of samples per period is an exact integer, thereby allowing all FFT components derived by the DSP in the control unit 172 of FIG. 4 to coincide with the various harmonics of the fundamental frequency. According to the Nyquist criteria, in order to prevent aliasing errors due to the sampling process performing the phasor estimations of the composite signal containing auxiliary signals up to, for example, the 500th harmonic of the fundamental frequency, there must be more than 1000 sample points per period. For a 6 MHz fundamental frequency, this sampling rate would correspond to 6 GHz, for which the implementation of the signal acquisition unit 500 may be difficult.

However, for periodic composite signals, it is possible to implement the signal acquisition unit 500 in a manner which would allow a lower sampling rate while still maintaining an "equivalent sample rate" corresponding to the desired sampling rate mentioned above. This method is known as "Equivalent Time Sampling" to those skilled in the technology of digitizing oscilloscopes. The method is described, for example, in the Technical Tutorial section of the "1990 Catalog Reference Guide to Digital Waveform Instruments" published by the LeCroy Corporation of Chesnut Ridge, N.Y.

Although the Equivalent Time Sampling method allows a low sampling rate for the analog-to-digital converter of the A/D 501, the fast response and small aperture time of the sample-and-hold circuitry must be maintained. A sampling head (Model SD-20) made by the Tektronix corporation of Beaverton, OR, can sample waveforms extending up to 20 GHz, and thus may be used as the sample-and-hold device in the A/D 501 of FIG. 15.

A digital implementation of other elements of the coherent multicarrier controller is also possible. For example, in an alternative embodiment of the phase variable comb generator 176 (FIGS. 4 and 11) a digital Arbitrary Function Generator (AFG) operating in the periodic mode can be used to generate a waveform containing the superposition of all required harmonically related reference signals at their desired amplitudes and phases. The DSP of control unit 172 would then perform all calculations to compute the changes required in the composite waveform stored in the AFG and subsequently will write the result into the AFG. A description of the Arbitrary Function Generator embodiment and function can be found in the Technical Tutorial section of the LeCroy catalog cited above. In applications where the composite coherent signal consists of unmodulated signals, such applications may arise in test signal generators, the AFG output can be connected directly to the combiner 182 (FIGS. 4 and 11), wherein the combining of the various harmonically related signals comprising the composite signal is achieved numerically in the DSP and subsequently stored in the AFG.

The multicarrier controller thus described and depicted schematically in FIG. 11, lends itself to immediate application in a coherent CATV head-end. In its most likely configuration, the phase variable comb generator, auxiliary carrier generator, phasor analyzer and the associated processing devices including the microcontroller and the DSP of the control unit, may all be housed in one housing. The input to the housing may consist of one line carrying N combined modulated RF signals while the outputs of the housing may consist of N phase reference signals (that may be combined on a single loop-through cable) that feed the "reference input" of N standard phase-locked CATV modulators. The combined signal may be output to feed the CATV network, such as shown in FIG. 1, which may include a power divider distributing the optimized signal to the laser transmitters serving fiber nodes. Thus, for a well controlled frequency response in the power divider, and for uniform characteristics in the frequency response of the laser transmitters, only one such controller would be necessary and each laser transmitter would require a wideband coupler, i.e., a microwave component to couple electrical signals to the laser. It may be desireable to supply monitor line 184 of FIG. 11 from an optical photodetector, thereby including the laser transmitter in this closed loop so as to ensure an optimization of peak amplitude or bilevel characteristics at the very last stage of transmission.

As indicated earlier, the auxiliary carriers need not be carried beyond the laser transmitter. However, their filtering out after the receiver detector may not be required, as the gradual loss of the auxiliary carriers takes place down the cascade of the bridges and line extenders. From distortion considerations, although optimality conditions for these auxiliary carriers are expected to degrade down the cascade, it may well prove advantageous to leave such low level auxiliary carriers in place since they are transmitted with phases and amplitudes adjusted to minimize distortions through any nonlinearity. In other words, the penalties incurred in filtering out the auxiliary carriers may outweigh the benefits of retaining them in the multicarrier signal.

Under present signaling methods, a 40 channel CATV system would allow approximately 5% Optical Modulation Index (OMI) per channel. At this modulation level, low noise floor lasers such as Distributed Feedback (DFB) lasers are typically used to meet the loss budget and dynamic range demands. At this channel load, an 8 dB advantage can be realized by using the coherent multicarrier controller. Thus, a 12% OMI can be used for each channel, thereby allowing lower cost Fabry-Perot lasers to be used with equal performance. Obviously, significant savings can be realized in systems requiring many fiber nodes in their architecture.

Alternatively, the 8 dB margin can be used with DFB lasers for longer haul distribution architectures and in some cases with the ability to avoid supertrunking or an AM microwave link (AML) and their related expensive hubs. Or, over 80 channels can be carried with a few dB added to the available loss budget.

The system can also be used in standard CATV coaxial applications. However, the benefits will depend on group delay distortions in the system, as the optimal phase relationships may gradually deteriorate down the amplifier cascade. The signal of FIG. 3 may be representative of the waveforms used in this application wherein auxiliary carriers cannot be carried further downstream on the CATV network due to amplifier and coaxial cable bandwidth limitations.

New 1 GHz amplifier technology might open the way for ultra-flat response systems which will benefit from auxiliary carrier signaling per the proposed system described above. Similarly, single point feed AML transmitters can be driven at a higher level using this signaling scheme, although the up-conversion process to 12 GHz results in a penalty of 3 dB in peak amplitude.

Although the preferred embodiments of the present invention have been shown and described as relating to CATV, the present invention could also be used to generate an unmodulated composite signal which could be used, for example, as a source of a test signal.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A system for generating a composite signal having a plurality of harmonically related signals, comprising:
   a signal generator for generating a plurality of harmonically related, receivable signals wherein the receivable signals have frequencies that are integral multiples of a preselected fundamental frequency;
   a signal generator for generating a plurality of harmonically related, auxiliary signals wherein the auxiliary signals have frequencies that are integral multiples of said fundamental frequency, the frequencies of the auxiliary signals selected so that they are different from the frequencies of said receivable signals, said auxiliary signals generated with specific phasor val so that peak-to-peak amplitude of said composite signal is less than that obtained from only combining the receivable signals; and
   a signal combiner that combines said receivable signals and said auxiliary signals thereby forming said composite signal.

2. The system defined in claim 1, wherein said composite signal includes receivable signals amplitude modulated with television signals.

3. The system defined in claim 2, wherein said fundamental frequency is 6 MHz.

4. The system defined in claim 2, wherein said fundamental frequency is 0.25 MHz.

5. The system defined in claim 1, wherein said auxiliary signal generator generates at least, a portion of said harmonically related signals with phasor values dependent on a predetermined function of the receivable signals.

6. The system defined in claim 5, wherein said predetermined function includes a nonlinear amplitude limiter.

7. The system defined in claim 1, additionally comprising adjustment means for adjusting phasor values of at least a portion of the signals of the composite signal.

8. The system defined in claim 7, wherein said adjustment means includes:
   nonlinear distortion means for processing said composite signal with a predetermined nonlinear function so as to form a distorted composite signal comprising a plurality of nonlinearly derived signals wherein each nonlinearly derived signal has s characteristic phasor;
   analyzer means for estimation the characteristic phasor value of at least a portion of the nonlinearly derived signals; and
   adjustment means responsive to said analyzer means for adjusting the phasor value of at least a portion of the signal of the composite signal, thereby reducing peak-to-peak amplitude of the composite signal.

9. The system defined in claim 8, wherein said nonlinear distortion means includes an amplitude limiter having a substantially linear response up to a limit value.

10. The system defined in claim 9, wherein the limit value is adjusted by comparing a predetermined function of the phasor values of the composite signal with a predetermined function of the phasor values of the distorted composite signal.

11. The system defined in claim 8, wherein said adjustment means includes digital processing means.

12. The system defined in claim 11, wherein said digital processing means includes a digital signal processor.

13. The system defined in claim 8, wherein said nonlinear distortion means includes digital processing means.

14. The system defined in claim 7, wherein said adjustment means adjusts phasor values recursively so that the peak-to-peak amplitude of said composite signal converges to a steady state of substantially minimum value.

15. The system defined in claim 8, wherein said nonlinear distortion means includes a nonlinear amplitude limiter having adjustable limit means.

16. A system for generating a bilevel composite signal having a plurality of harmonically related signals, comprising:
   a signal generator for generating a plurality of harmonically related, receivable signals wherein the receivable signals have frequencies that are integral multiples of a preselected fundamental frequency;

a signal generator for generating a plurality of harmonically related, auxiliary signals wherein the auxiliary signals have frequencies that are integral multiples of said fundamental frequency, the frequencies of the auxiliary signals selected so that they are different from the frequencies of said receivable signals, said auxiliary signals generated with specific phasor values so that the composite signal is substantially a bilevel signal; and a signal combiner that combines said receivable signals and said auxiliary signals thereby forming said bilevel composite signal.

17. A multicarrier system, comprising:

a signal generator that generates a composite signal, said composite signal comprising a plurality of harmonically related signals wherein the signals have frequencies that are integral multiples of a preselected fundamental frequency, and wherein each signal has a characteristic phasor;

a distortion generator for processing said composite signal with a predetermined function so as to form a distorted composite signal comprising a plurality of nonlinearly derived signals, wherein each nonlinearly derived signal has a characteristic phasor;

an analyzer that estimates the phasor value of at least a portion of the nonlinearly derived signals; and a phasor adjuster responsive to said analyzer that adjusts the phasor value of at least a portion of the signals of the composite signal thereby producing peak-to-peak amplitude of the composite signal.

18. The system defined in claim 17, wherein said composite signal includes signals amplitude modulated with television signals.

19. The system defined in claim 18, wherein said fundamental frequency is 6 MHz.

20. The system defined in claim 18, wherein said fundamental frequency is 0.25 MHz.

21. The system defined in claim 17, wherein said signal generator includes an analog signal combiner.

22. The system defined in claim 17, wherein said signal generator includes a digital processor that generates a digital representation of said composite signal, the signal generator further including a digital-to-analog converter connected to said digital processor to convert the digital composite signal into the analog composite signal.

23. The system defined in claim 17, wherein said distortion generator includes an amplitude limiter having a substantially linear response up to a selectable limit value.

24. The system defined in claim 23, wherein the limit value is adjusted by comparing a predetermined function of the phasor values of the composite signal with a predetermined function of the phasor values of the distorted composite signal.

25. The system defined in claim 17, wherein the phasor adjuster includes digital processing means.

26. The system defined in claim 25, wherein said digital processing means includes a digital signal processor.

27. The system defined in claim 17, wherein said distortion generator includes digital processing means.

28. The system defined in claim 17, wherein said system adjusts phasors recursively so that the peak-to-peak amplitude of said composite signal converges to a steady state of substantially minimum value.

29. A multicarrier controller for CATV, comprising:

receivable signal generation means for generating a plurality of harmonically elated, receivable signals wherein the signals have frequencies that re integral multiples of a preselected fundamental frequency, and wherein each the receivable signals is characterized by a phase parameter;

modulation means for impressing said receivable signals with television waveforms;

auxiliary signal generation means or generating a plurality of harmonically related, auxiliary signals wherein the signals have frequencies that re integral multiples of said fundamental frequency, and wherein each of the auxiliary signals is characterized by a phasor, the frequencies of the auxiliary signals nonintersecting with the frequencies of said receivable signals;

means for combining said modulated receivable signals and said auxiliary signals, thereby forming a composite signal having peak-to-peak amplitude less than that obtained from only combining the modulated receivable signals;

nonlinear distortion means for processing said composite signal with a predetermined nonlinear function so as to form a distorted composite signal, the signals of the distorted composite signal having a harmonic relationship based on said fundamental frequency and wherein each of said signals of the distorted composite signal is characterized by a phasor;

pahsor analyzer means for estimating phasor increments of said signals comprising the distorted composite signal;

phase adjustment means responsive to said phasor analyzer means for adjusting the phase parameters of the receivable signals, said phase adjustment means in communication with said receivable signal generation means; and phasor adjustment means responsive to said phasor analyzer means for adjusting the phasor values of the auxiliary signals, said phasor adjustment means in communication with said auxiliary signal generation means.

30. A coherent multicarrier controller, comprising;

carrier generation means for generating a set of harmonically related carriers for the transmission of television signals, each said carrier having a frequency that is an integral multiple of a predetermined fundamental frequency, wherein the phase of each carrier can be varied;

modulation means in communication with said carrier generation means for modulating said harmonically related carriers with television signals received from an outside program source;

signal combination means in communication with said modulation means for combining said modulated harmonically related carriers into a multicarrier signal;

nonlinear sampling means in communication with said signal combination means for limiting the amplitude of said multicarrier signal nonlinearly so as to distort the phasor associated with each carrier;

phasor estimation means in communication with said nonlinear sampling means or estimating each distortion phasor; and phase adjustment means in communication with said phasor estimation means for calculating a phase difference for each carrier, said phase difference communicated to said carrier generation mans for phase adjustment of said harmonically related carriers, thereby reducing peak-to-peak amplitude of said multicarrier signal.

31. In a system having a first group of harmonically related signals having frequencies that re integral multiples of a preselected fundamental frequency, a method for generating a composite signal with reduced peak-to-peak amplitude, said method comprising the steps of:

generating a second group of harmonically related, auxiliary signals wherein the auxiliary signals have frequencies that are integral multiples of said fundamental frequency, the frequencies of the auxiliary signals selected so that the are different from the frequencies of said signals of the first group, said auxiliary signals generated with specific phasor values so that the peak-to-peak amplitude of said composite signal is less than that obtained from only combining the signals of the first group; and combining said first group of signals and said second group of auxiliary signals, thereby forming said composite signal.

32. The method of claim 31, wherein a signal of said first group is amplitude modulated with television signals.

33. The method of claim 31, wherein the step f generating said auxiliary signals includes generating at least a portion of said harmonically related signals with phasor values dependent on a predetermined nonlinear function of the signals of the first group.

34. The method of claim 31, additionally comprising the step of adjusting the phasor values of at lest a portion of the signals comprising said composite signal.

35. The method of claim 34, wherein said phasor adjustment step comprises the steps of:

distorting said composite signal with a predetermined nonlinear function so a s to form a distorted composite signal comprising a plurality of nonlinearly derived signals wherein each nonlinearly derived signal has a characteristic phasor;

estimating the characteristic phasor value of at lest a portion of the nonlinearly derived signals; and adjusting the phasor value of at least a portion of the signals of the composite signal in accordance with a predetermined function of the phasor values of said nonlinearly derived signals, thereby reducing peak-to-peak amplitude of the composite signal.

36. The method of claim 34, wherein said phasor adjustment step is performed recursively so that the peak-to-peak amplitude of said composite signal converges to a steady state of substantially minimum value.

37. The method of claim 35, wherein said predetermined nonlinear function includes amplitude limiting with an adjustable limit value.

38. In a system having a first group of harmonically related signals having frequencies that are integral multiples of a preselected fundamental frequency, a method for generating a bilevel composite signal, said method comprising the steps of:

generating a second group of harmonically related, auxiliary signals wherein the auxiliary signals have frequencies that are integral multiples of said fundamental frequency, the frequencies of the auxiliary signals selected so that they are different from frequencies of said signals of the first group, said auxiliary signals generated with specific pahsor values so that the composite signal is substantially a bilevel signal; and combining said fist group of signals and said second group of auxiliary signals thereby forming said bilevel composite signal.

39. The method of claim 38, wherein a signal of said first group is amplitude modulated with television signals.

40. The method of claim 38, wherein the step of generating said auxiliary signals includes generating at least a portion of said harmonically related signals with phasor values dependent on a predetermined nonlinear function of the signals of the first group.

41. The method of claim 38, additionally comprising the step of adjusting the pahsor values of at least a portion of the signals comprising said composite signal.

42. The method of claim 41, wherein said phasor adjustment step comprises the steps of:

distorting said composite signal with a predetermined nonlinear function so as to form a distorted composite signal comprising a plurality of nonlinearly derived signals wherein each nonlinearly derived signal has a characteristic phasor;

estimating the characteristic phasor value of at least a portion of the nonlinearly derived signals; and adjusting the phasor value of at least a portion of the signals of the composite signal in accordance with a predetermined function of the phasor values of said nonlinearly derived signals, thereby arriving at a subsonically bilevel composite signal.

43. The method of claim 41, wherein said phasor adjustment step is performed recursively so said composite signal converges to a steady state in which said composite signal is substantially bilevel.

44. The method of claim 42, wherein said predetermined nonlinear function includes amplitude limitign with an adjustable limit value.

45. In a multicarrier system, a method of generating a composite signal with reduced peak-to-peak amplitude, said method comprising the steps of:

generating a composite signal, said composite signal comprising a plurality of harmonically related signals wherein the signals have frequencies that are integral multiples of a preselected fundamental frequency, and wherein each signal has a characteristic phasor;

distorting said composite signal with a predetermined nonlinear function so as to form a distorted composite signal comprising a plurality of nonlinearly derived signals wherein each nonlinearly derived signal has a characteristic phasor;

estimating the characteristic phasor value of at least a portion of the nonlinearly derived signals; and adjusting the phasor value of at least a portion of the signals of said composite signal in accordance with a predetermined function of the phasor values of said nonlinearly derived signals, thereby reducing the peak-to-peak amplitude of said composite signal.

46. The method of claim 45, wherein said composite signal includes a signal that is amplitude modulated with television signals.

47. The method of claim 46, wherein said fundamental frequency is 6 MHz.

48. The method of claim 46, wherein said fundamental frequency is 0.25 MHz.

49. The method of claim 45, wherein said distorting step includes an amplitude limiting function with a substantially linear response up to a limit value.

50. The method of claim 49, wherein the limit value is adjusted by comparing a predetermined function of the phasor values of the composite signal with a predetermined function of the phasor values of the distorted composite signal.

51. The method of claim 45, wherein said adjusting step is performed recursively so that the peak-to-peak amplitude of said composite signal converges to a steady state of substantially minimum value.

* * * * *